United States Patent
Sadiq et al.

(10) Patent No.: US 10,554,284 B2
(45) Date of Patent: Feb. 4, 2020

(54) BEAM REFINEMENT FOR ACTIVE AND CANDIDATE BEAMS

(71) Applicant: QUALCOMM Incorporated, San Diego, CA (US)

(72) Inventors: Bilal Sadiq, Basking Ridge, NJ (US); Ashwin Sampath, Skillman, NJ (US); Tao Luo, San Diego, CA (US); Juergen Cezanne, Ocean Township, NJ (US); Sundar Subramanian, Bridgewater, NJ (US); Muhammad Nazmul Islam, Edison, NJ (US); Alexei Yurievitch Gorokhov, San Diego, CA (US); Shrenik Patel, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/595,328

(22) Filed: May 15, 2017

(65) Prior Publication Data

US 2018/0034531 A1  Feb. 1, 2018

Related U.S. Application Data

(60) Provisional application No. 62/369,642, filed on Aug. 1, 2016.

(51) Int. Cl.
  *H04B 7/06* (2006.01)
  *H04W 72/04* (2009.01)
  (Continued)

(52) U.S. Cl.
  CPC ......... *H04B 7/0695* (2013.01); *H04B 7/0408* (2013.01); *H04B 7/0617* (2013.01);
  (Continued)

(58) Field of Classification Search
  CPC .. H04B 7/0408; H04B 7/0617; H04B 7/0632; H04B 7/0695; H04B 7/088
  See application file for complete search history.

(56) References Cited

U.S. PATENT DOCUMENTS

2013/0279437 A1* 10/2013 Ng ................ H04W 48/16
                                          370/329
2013/0286960 A1* 10/2013 Li ................ H04W 72/042
                                          370/329

(Continued)

FOREIGN PATENT DOCUMENTS

| KR | 20150066630 A | 6/2015 |
|----|---------------|--------|
| WO | WO-2015141065 A1 | 9/2015 |
| WO | WO-2017074497 A1 | 5/2017 |

OTHER PUBLICATIONS

ISA/EPO, Partial International Search Report of the International Searching Authority, Int'l. App. No. PCT/US2017/044507, dated Oct. 16, 2017, European Patent Office, Rijswijk, NL, 20 pgs.

(Continued)

*Primary Examiner* — Gary Mui
(74) *Attorney, Agent, or Firm* — Holland & Hart LLP

(57) ABSTRACT

Methods, systems, and devices for wireless communication are described. A user equipment (UE) may be communicating with a base station via beamformed transmissions on an active beam. The UE may receive from the base station refined reference signals (RRSs) that include an active beam RRS corresponding to the active beam. The UE may identify that the active beam RRS corresponds to the active beam and perform a beam state measurement on the active beam RRS. The UE may refine the active beam based at least in part on the beam state information of the active beam RRS.

60 Claims, 20 Drawing Sheets

BRS Procedure

Refinement Procedure

(51) Int. Cl.
*H04B 7/08* (2006.01)
*H04W 76/10* (2018.01)
*H04B 7/0408* (2017.01)

(52) U.S. Cl.
CPC .......... *H04B 7/0632* (2013.01); *H04B 7/088* (2013.01); *H04W 72/046* (2013.01); *H04W 76/10* (2018.02)

(56) References Cited

U.S. PATENT DOCUMENTS

| | | | |
|---|---|---|---|
| 2013/0300604 A1* | 11/2013 | Lopez | H01Q 3/34 342/372 |
| 2015/0215908 A1* | 7/2015 | Seo | H04L 5/0048 370/329 |
| 2015/0382205 A1 | 12/2015 | Lee et al. | |
| 2016/0065284 A1 | 3/2016 | Yu et al. | |
| 2017/0041811 A1* | 2/2017 | Qiao | H04W 16/28 |
| 2017/0094531 A1 | 3/2017 | Kakishima et al. | |
| 2017/0207845 A1* | 7/2017 | Moon | H04B 7/088 |
| 2017/0208494 A1* | 7/2017 | Moon | H04W 24/10 |
| 2017/0288743 A1* | 10/2017 | Nam | H04B 7/024 |
| 2017/0288763 A1* | 10/2017 | Yoo | H01Q 3/10 |
| 2017/0302341 A1* | 10/2017 | Yu | H04B 7/0639 |
| 2017/0302414 A1* | 10/2017 | Islam | H04L 5/0023 |
| 2017/0303263 A1* | 10/2017 | Islam | H04B 7/0408 |
| 2017/0346544 A1* | 11/2017 | Islam | H04W 74/085 |
| 2017/0367114 A1* | 12/2017 | Ahn | H04L 5/0048 |
| 2018/0034606 A1* | 2/2018 | Ahn | H04L 5/0048 |
| 2018/0049055 A1* | 2/2018 | Wiberg | H04B 7/0695 |
| 2018/0109304 A1* | 4/2018 | Wiberg | H04B 7/0617 |
| 2018/0262252 A1* | 9/2018 | Oh | H04B 7/06 |
| 2018/0279189 A1* | 9/2018 | Bergstrom | H04W 36/0083 |
| 2019/0007116 A1* | 1/2019 | Chang | H04B 7/0684 |
| 2019/0089435 A1* | 3/2019 | Mondal | H04B 17/318 |

OTHER PUBLICATIONS

Cisco et al., "Test Plan for Air Interface (Release 1) Verizon 5G TF; Test Plan—Air Interface Working Group; Verizon 5th Generation Radio Access; Test Plan for Air Interface (Release 1)", Cellco Partnership d/b/a Verizon Wireless, Jul. 19, 2016, pp. 1-38, XP055319734, Retrieved from the Internet: URL:http://www.5gtf.org/5GTF_Test_Plan_AI_v1p1.pdf [retrieved on Nov. 15, 2016].

Cisco., et al,, "Verizon 5G TF; Air Interface Working Group; Verizon 5th Generation Radio Access; Physical Layer procedures (Release 1)," Jun. 29, 2016, pp. 1-43, XP055318107, Retrieved from the Internet: URL:http://www.5gtf.org/V5G_213_v1p0.pdf [retrived on Nov. 10, 2016].

International Search Report and Written Opinion—PCT/US2017/044507—ISA/EPO —dated Jan. 18, 2018.

* cited by examiner

BEAM REFINEMENT FOR ACTIVE AND CANDIDATE BEAMS

CROSS REFERENCES

The present Application for Patent claims priority to U.S. Provisional Patent Application No. 62/369,642 by Sadiq, et al., entitled "Beam Refinement For Active and Candidate Beams," filed Aug. 1, 2016, assigned to the assignee hereof.

BACKGROUND

The following relates generally to wireless communication and more specifically to beam refinement for active and candidate beams.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communication system may include a number of base stations, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communications between two wireless nodes, e.g., between a base station and a UE, may use beams or beam-formed signals for transmission and/or reception. A beam used for such wireless communications may be referred to as an active beam or a serving beam. Sometimes, due to changing communication conditions, movement of a UE, etc., an active beam may be refined. For example, a UE active beam or a base station active beam may be refined. Additionally, there may also be a need to explore candidate beams or alternatives to the currently employed active beam and/or to measure a beam state of the active beam as well as other beam candidates. Thus, the active beam may initially be picked from a reference beam and then refined over time.

SUMMARY

The described techniques relate to improved methods, systems, devices, or apparatuses that support beam refinement for active and candidate beams in a wireless communication system, such as a millimeter wave (mmW) communication system. In some aspects, the described techniques provide for a user equipment (UE) and a base station to be communicating using beamformed transmissions on an active beam. The active beam may be selected using a beam reference signal (BRS) procedure, for example, between the UE and the base station. The base station may select refinement reference signal(s) (RRS)(s) for a refinement procedure of the active beam with the UE. The RRS(s) may include at least an RRS that corresponds to the active beam, e.g., an active beam RRS that is associated with the same antenna ports. In some examples, the base station may select an RRS transmission configuration for the transmission of the RRS, e.g., based on the capabilities and/or preferences of the UE.

The base station may transmit the RRS(s), including the active beam RRS, to the UE and, in some examples, may convey an indication of which RRS is the active beam RRS. The UE may receive the RRS(s) and identify the active beam RRS, e.g., may identify or otherwise determine that the active beam RRS corresponds to the active beam currently being used for communications. The UE may perform a beam state measurement for some or all of the RRS(s), or may perform a beam state measurement for at least the active beam RRS. The UE may refine the active beam using the beam state measurement of the active beam RRS, e.g., may adjust one or more UE receive beam parameters for communicating on the active beam. Thus, the UE may autonomously refine the UE beam parameters to improve wireless communications using beamformed transmissions on the active beam.

A method of wireless communication is described. The method may include communicating with a base station via one or more beamformed transmissions on an active beam, receiving from the base station one or more RRSs, the one or more RRSs including an active beam RRS corresponding to the active beam, identifying the active beam RRS as corresponding to the active beam, performing a beam state measurement on at least the active beam RRS, and refining the active beam based at least in part on the beam state measurement on the active beam RRS.

An apparatus for wireless communication is described. The apparatus may include means for communicating with a base station via one or more beamformed transmissions on an active beam, means for receiving from the base station one or more RRSs, the one or more RRSs including an active beam RRS corresponding to the active beam, means for identifying the active beam RRS as corresponding to the active beam, means for performing a beam state measurement on at least the active beam RRS, and means for refining the active beam based at least in part on the beam state measurement on the active beam RRS.

A further apparatus is described. The apparatus may include a processor, memory in electronic communication with the processor, and instructions stored in the memory. The instructions may be operable to cause the processor to communicate with a base station via one or more beamformed transmissions on an active beam, receive from the base station one or more RRSs, the one or more RRSs including an active beam RRS corresponding to the active beam, identify the active beam RRS as corresponding to the active beam, perform a beam state measurement on at least the active beam RRS, and refine the active beam based at least in part on the beam state measurement on the active beam RRS.

A non-transitory computer readable medium for wireless communication is described. The non-transitory computer-readable medium may include instructions to cause a processor to communicate with a base station via one or more beamformed transmissions on an active beam, receive from the base station one or more RRSs, the one or more RRSs including an active beam RRS corresponding to the active beam, identify the active beam RRS as corresponding to the active beam, perform a beam state measurement on at least the active beam RRS, and refine the active beam based at least in part on the beam state measurement on the active beam RRS.

In some examples of the method, apparatus, or non-transitory computer-readable medium described above, the processes, features, means, or instructions for identifying the active beam RRS as corresponding to the active beam may include determining a resource identifier (ID) associated with the active beam RRS. Some examples of the method, apparatus, or non-transitory computer-readable medium described above may further include processes, features, means, or instructions for identifying the resource ID based on an indication conveyed in a radio resource control (RRC) configuration procedure performed with the base station. In some examples, the resource ID is associated with an antenna port configuration used by the base station to transmit the active beam RRS and the active beam.

In some examples of the method, apparatus, or non-transitory computer-readable medium described above, the processes, features, means, or instructions for identifying the active beam RRS as corresponding to the active beam may include identifying one or more antenna ports associated with the active beam RRS based on an antenna port configuration of the active beam. Some examples of the method, apparatus, or non-transitory computer-readable medium described above may further include processes, features, means, or instructions for transmitting a beam state measurement report to the base station. In some examples, the beam state measurement report comprises a reference signal received power associated with at least the active beam RRS. In some examples, the beam state measurement report associated with the active beam RRS does not include an index associated with a resource ID.

In some examples of the method, apparatus, or non-transitory computer-readable medium described above, the processes, features, means, or instructions for refining the active beam may include using one or more receive beams to receive the active beam RRS. Some examples of the method, apparatus, or non-transitory computer-readable medium described above may further include processes, features, means, or instructions for identifying a refined beam state information of the one or more receive beams, and using the refined beam state information to adjust the active beam used by a UE. Some examples of the method, apparatus, or non-transitory computer-readable medium described above may further include processes, features, means, or instructions for adjusting the active beam at a predetermined time. Some examples of the method, apparatus, or non-transitory computer-readable medium described above may further include processes, features, means, or instructions for transmitting an indicator to the base station indicative of the adjustment to the active beam.

In some examples of the method, apparatus, or non-transitory computer-readable medium described above, the processes, features, means, or instructions for refining the active beam may include receiving an active beam refinement authorization from the base station. Some examples of the method, apparatus, or non-transitory computer-readable medium described above may further include processes, features, means, or instructions for refining the active beam based at least in part on the active beam refinement authorization.

Some examples of the method, apparatus, or non-transitory computer-readable medium described above may further include processes, features, means, or instructions for using a plurality of UE antenna arrays to perform the beam state measurement on at least the active beam RRS. Some examples of the method, apparatus, or non-transitory computer-readable medium described above may further include processes, features, means, or instruction for receiving, from the base station, an indicator associating the one or more RRSs with a prior reference signal transmitted from the base station. Some examples of the method, apparatus, or non-transitory computer-readable medium described above may further include processes, features, means, or instructions for receiving, from the base station, an indicator associating each of the one or more RRSs with a corresponding prior reference signal transmitted from the base station. In some examples, the RRS comprises at least one of a beam refined reference signal (BRSS) or a channel state information reference signal (CSI-RS).

A method of wireless communication is described. The method may include communicating with a UE via one or more beamformed transmissions using an active beam, selecting one or more RRSs for transmission to the UE, the one or more RRSs including an active beam RRS corresponding to the active beam, transmitting the one or more RRSs, including the active beam RRS, to the UE, and indicating to the UE that the active beam RRS corresponds to the active beam.

An apparatus for wireless communication is described. The apparatus may include means for communicating with a UE via one or more beamformed transmissions using an active beam, means for selecting one or more RRSs for transmission to the UE, the one or more RRSs including an active beam RRS corresponding to the active beam, means for transmitting the one or more RRSs, including the active beam RRS, to the UE, and means for indicating to the UE that the active beam RRS corresponds to the active beam.

A further apparatus is described. The apparatus may include a processor, memory in electronic communication with the processor, and instructions stored in the memory. The instructions may be operable to cause the processor to communicate with a UE via one or more beamformed transmissions using an active beam, select one or more RRSs for transmission to the UE, the one or more RRSs including an active beam RRS corresponding to the active beam, transmit the one or more RRSs, including the active beam RRS, to the UE, and indicate to the UE that the active beam RRS corresponds to the active beam.

A non-transitory computer readable medium for wireless communication is described. The non-transitory computer-readable medium may include instructions to cause a processor to communicate with a UE via one or more beamformed transmissions using an active beam, select one or more RRSs for transmission to the UE, the one or more RRSs including an active beam RRS corresponding to the active beam, transmit the one or more RRSs, including the active beam RRS, to the UE, and indicate to the UE that the active beam RRS corresponds to the active beam.

In some examples of the method, apparatus, or non-transitory computer-readable medium described above, the processes, features, means, or instructions for indicating to the UE that the active beam RRS corresponds to the active beam may include conveying an indication of a resource ID associated with the active beam RRS, wherein the resource ID is further associated with the active beam. In some examples, the indication is an antenna port configuration used by the base station to transmit the active beam RRS.

Some examples of the method, apparatus, or non-transitory computer-readable medium described above may further include processes, features, means, or instructions for receiving a beam state measurement report from the UE. The beam state measurement report may include a reference signal received power associated with at least the active beam RRS. The beam state measurement report may include an index associated with a resource ID associated with the active beam RRS. In other examples, the beam state measurement report associated with the active beam RRS may not include a resource ID associated with the active beam RRS.

Some examples of the method, apparatus, or non-transitory computer-readable medium described above may further include processes, features, means, or instructions for receiving an indication from the UE that the UE has used a refined beam to adjust a UE beamform signal. Some examples of the method, apparatus, or non-transitory computer-readable medium described above may further include processes, features, means, or instructions for transmitting, to the UE, an indicator associating the one or more RRSs with a prior reference signal transmitted from the base station. Some examples of the method, apparatus, or non-transitory computer-readable medium described above may further include processes, features, means, or instructions for transmitting, to the UE, an indicator associating each of the one or more RRSs with a corresponding prior reference signal transmitted from the base station. Some examples of the method, apparatus, or non-transitory computer-readable medium described above may further include processes, features, means, or instructions for transmitting an active beam refinement authorization to the UE, wherein the UE refines the active beam based at least in part on the active beam refinement authorization.

A method of wireless communication is described. The method may include receiving, from a base station, an indicator associating one or more antenna ports of a RRS with a prior reference signal transmitted from the base station, and receiving, from the base station, the RRS using an antenna configuration based at least in part on an antenna configuration used for receiving the prior reference signal.

An apparatus for wireless communication is described. The apparatus may include means for receiving, from a base station, an indicator associating one or more antenna ports of a RRS with a prior reference signal transmitted from the base station, and means for receiving, from the base station, the RRS using an antenna configuration based at least in part on an antenna configuration used for receiving the prior reference signal.

A further apparatus is described. The apparatus may include a processor, memory in electronic communication with the processor, and instructions stored in the memory. The instructions may be operable to cause the processor to receive, from a base station, an indicator associating one or more antenna ports of a RRS with a prior reference signal transmitted from the base station, and receive, from the base station, the RRS using an antenna configuration based at least in part on an antenna configuration used for receiving the prior reference signal.

A non-transitory computer readable medium for wireless communication is described. The non-transitory computer-readable medium may include instructions to cause a processor to receive, from a base station, an indicator associating one or more antenna ports of a RRS with a prior reference signal transmitted from the base station, and receive, from the base station, the RRS using an antenna configuration based at least in part on an antenna configuration used for receiving the prior reference signal.

A method of wireless communication is described. The method may include receiving, from a base station, an indicator associating each of one or more antenna ports of a RRS with a prior reference signal transmitted from the base station, and receiving, from the base station, the one or more ports of the RRS using an antenna configuration based at least in part on the antenna configuration used for receiving the prior reference signals.

An apparatus for wireless communication is described. The apparatus may include means for receiving, from a base station, an indicator associating each of one or more antenna ports of a RRS with a prior reference signal transmitted from the base station, and means for receiving, from the base station, the one or more ports of the RRS using an antenna configuration based at least in part on the antenna configuration used for receiving the prior reference signals.

A further apparatus is described. The apparatus may include a processor, memory in electronic communication with the processor, and instructions stored in the memory. The instructions may be operable to cause the processor to receive, from a base station, an indicator associating each of one or more antenna ports of a RRS with a prior reference signal transmitted from the base station, and receive, from the base station, the one or more ports of the RRS using an antenna configuration based at least in part on the antenna configuration used for receiving the prior reference signals.

A non-transitory computer readable medium for wireless communication is described. The non-transitory computer-readable medium may include instructions to cause a processor to receive, from a base station, an indicator associating each of one or more antenna ports of a RRS with a prior reference signal transmitted from the base station, and receive, from the base station, the one or more ports of the RRS using an antenna configuration based at least in part on the antenna configuration used for receiving the prior reference signals.

A method of wireless communication is described. The method may include receiving, from, a UE, a beam state measurement report comprising beam state information (BSI) for a predetermined number of previously transmitted BRSs, selecting one or more RRSs for transmission to the UE based at least in part on the beam state measurement report, and transmitting the one or more RRSs in a predetermined order that is based at least in part on the beam state measurement report.

An apparatus for wireless communication is described. The apparatus may include means for receiving, from, a UE, a beam state measurement report comprising BSI for a predetermined number of previously transmitted BRSs, means for selecting one or more RRSs for transmission to the UE based at least in part on the beam state measurement report, and means for transmitting the one or more RRSs in a predetermined order that is based at least in part on the beam state measurement report.

A further apparatus is described. The apparatus may include a processor, memory in electronic communication with the processor, and instructions stored in the memory. The instructions may be operable to cause the processor to receive, from, a UE, a beam state measurement report comprising BSI for a predetermined number of previously transmitted BRSs, select one or more RRSs for transmission to the UE based at least in part on the beam state measurement report, and transmit the one or more RRSs in a predetermined order that is based at least in part on the beam state measurement report.

A non-transitory computer readable medium for wireless communication is described. The non-transitory computer-readable medium may include instructions to cause a processor to receive, from, a UE, a beam state measurement report comprising BSI for a predetermined number of previously transmitted BRSs, select one or more RRSs for transmission to the UE based at least in part on the beam state measurement report, and transmit the one or more RRSs in a predetermined order that is based at least in part on the beam state measurement report.

In some examples, the predetermined order corresponds to an order of the BSI for the BRSs conveyed in the beam state measurement report. In some examples, the BSI conveys an indication of a received signal strength for each of the BRSs, and the predetermined order is based at least in part on the received signal strength for each of the BRSs.

Some examples of the method, apparatus, or non-transitory computer-readable medium described above may further include processes, features, means, or instructions for mapping the one or more RRSs to resource IDs that correspond to resource IDs associated with the BRSs. Some examples of the method, apparatus, or non-transitory computer-readable medium described above may further include processes, features, means, or instructions for transmitting the one or more RRSs in a sequential order, wherein the sequential order is based at least in part on the beam state measurement report. In some examples, each of the one or more RRSs are transmitted for a predetermined number of symbols in accordance with the sequential order.

A method of wireless communication is described. The method may include receiving, from, a UE, a beam state measurement report comprising BSI for a predetermined number of previously transmitted BRSs, the beam state measurement report further comprising an indication of a UE receive configuration, selecting one or more RRSs for transmission to the UE based at least in part on the beam state measurement report, selecting an RRS transmission configuration based at least in part on the UE receive configuration, and transmitting the one or more RRSs in accordance with the RRS transmission configuration.

An apparatus for wireless communication is described. The apparatus may include means for receiving, from, a UE, a beam state measurement report comprising BSI for a predetermined number of previously transmitted BRSs, the beam state measurement report further comprising an indication of a UE receive configuration, means for selecting one or more RRSs for transmission to the UE based at least in part on the beam state measurement report, means for selecting an RRS transmission configuration based at least in part on the UE receive configuration, and means for transmitting the one or more RRSs in accordance with the RRS transmission configuration.

A further apparatus is described. The apparatus may include a processor, memory in electronic communication with the processor, and instructions stored in the memory. The instructions may be operable to cause the processor to receive, from, a UE, a beam state measurement report comprising BSI for a predetermined number of previously transmitted BRSs, the beam state measurement report further comprising an indication of a UE receive configuration, select one or more RRSs for transmission to the UE based at least in part on the beam state measurement report, select an RRS transmission configuration based at least in part on the UE receive configuration, and transmit the one or more RRSs in accordance with the RRS transmission configuration.

A non-transitory computer readable medium for wireless communication is described. The non-transitory computer-readable medium may include instructions to cause a processor to receive, from, a UE, a beam state measurement report comprising BSI for a predetermined number of previously transmitted BRSs, the beam state measurement report further comprising an indication of a UE receive configuration, select one or more RRSs for transmission to the UE based at least in part on the beam state measurement report, select an RRS transmission configuration based at least in part on the UE receive configuration, and transmit the one or more RRSs in accordance with the RRS transmission configuration.

In some examples, the UE receive configuration comprises one or more of a number of physical antenna arrays of the UE, a number of receive chains of the UE, a number of supported receive beams of the UE, or combinations thereof. In some examples of the method, apparatus, or non-transitory computer-readable medium described above, the processes, features, means, or instructions for transmitting the one or more RRSs in accordance with the RRS transmission configuration may include transmitting each of the one or more RRSs in at least one of a predetermined order or according to a time division multiplexing (TDM) configuration.

Some examples of the method, apparatus, or non-transitory computer-readable medium described above may further include processes, features, means, or instructions for transmitting the one or more RRSs in accordance with the RRS transmission configuration comprises transmitting each of the one or more RRSs for a predetermined duration. In some examples, the predetermined duration comprises a predetermined number of symbols. Some examples of the method, apparatus, or non-transitory computer-readable medium described above may further include processes, features, means, or instructions for transmitting the one or more RRSs in accordance with the RRS transmission configuration comprises transmitting at least a portion of the one or more RRSs during the same symbol.

A method of wireless communication is described. The method may include transmitting, to a base station, a beam state measurement report comprising BSI for a predetermined number of previously transmitted BRSs, the beam state measurement report further comprising an indication of a UE receive configuration, and receiving one or more RRSs transmitted from the base station according to an RRS transmission configuration, wherein the one or more RRSs are selected based at least in part on the beam state measurement report.

An apparatus for wireless communication is described. The apparatus may include means for transmitting, to a base station, a beam state measurement report comprising BSI for a predetermined number of previously transmitted BRSs, the beam state measurement report further comprising an indication of a UE receive configuration, and means for receiving one or more RRSs transmitted from the base station according to an RRS transmission configuration, wherein the one or more RRSs are selected based at least in part on the beam state measurement report.

A further apparatus is described. The apparatus may include a processor, memory in electronic communication with the processor, and instructions stored in the memory. The instructions may be operable to cause the processor to transmit, to a base station, a beam state measurement report comprising BSI for a predetermined number of previously transmitted BRSs, the beam state measurement report further comprising an indication of a UE receive configuration, and receive one or more RRSs transmitted from the base station according to an RRS transmission configuration, wherein the one or more RRSs are selected based at least in part on the beam state measurement report.

A non-transitory computer readable medium for wireless communication is described. The non-transitory computer-readable medium may include instructions to cause a processor to transmit, to a base station, a beam state measurement report comprising BSI for a predetermined number of previously transmitted BRSs, the beam state measurement report further comprising an indication of a UE receive configuration, and receive one or more RRSs transmitted from the base station according to an RRS transmission configuration, wherein the one or more RRSs are selected based at least in part on the beam state measurement report.

Some examples of the method, apparatus, or non-transitory computer-readable medium described above may further include processes, features, means, or instructions for receiving the one or more RRSs in accordance with the RRS transmission configuration comprises receiving each of the one or more RRSs in at least one of a predetermined order or according to a TDM configuration. Some examples of the method, apparatus, or non-transitory computer-readable medium described above may further include processes, features, means, or instructions for receiving the one or more RRSs in accordance with the RRS transmission configuration comprises receiving each of the one or more RRSs for a predetermined duration. In some examples, the predetermined duration comprises a predetermined number of symbols. Some examples of the method, apparatus, or non-transitory computer-readable medium described above may further include processes, features, means, or instructions for receiving the one or more RRSs in accordance with the RRS transmission configuration comprises receiving at least a portion of the one or more RRSs during the same symbol.

DETAILED DESCRIPTION

Figure 1:
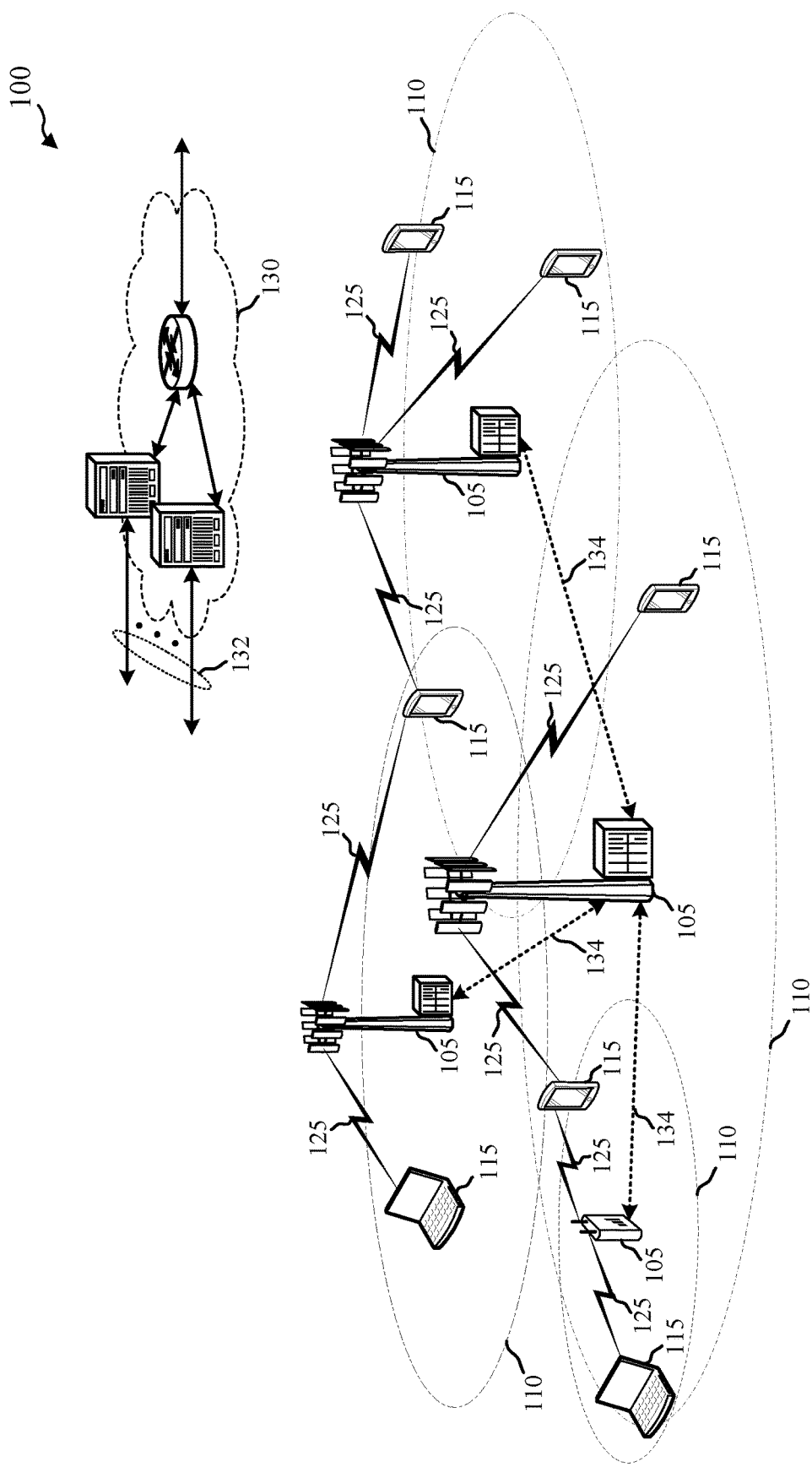
FIG. 1 illustrates an example of a system for wireless communication that supports beam refinement for active and candidate beams in accordance with aspects of the present disclosure.

Wireless communications between two wireless nodes, e.g., a base station (BS) and a user equipment (UE), may include beamformed transmissions on an active beam. The active beam in this context may be defined as a BS-UE beam pair that is currently being used for the wireless communications. Candidate beams may be other beams that may be transmitted from the base station and may have a different shape and/or be oriented in different directions. Such candidate beams may also be used for communications, e.g., selected as a new active beam when conditions are appropriate. The candidate beams may be shortlisted using a measurement report of a reference signal, such as an earlier beam reference signal (BRS) and/or a beam refinement reference signal (BRRS). The candidate beams may also be selected for having properties similar to the active beam, e.g., in terms of the transmission direction from the base station.

Aspects of the disclosure are initially described in the context of a wireless communication system, such as a millimeter wave (mmW) wireless communication system. The described techniques enable a UE to autonomously refine an active beam based on refinement reference signal(s) (RRS(s)) received from a base station during a refinement procedure. For example, the base station may transmit RRS(s), such as BRRS and/or a channel state information reference signal (CSI-RS), that the UE may use to adjust and refine the UE active beam. The UE may also use this signal to perform beam state measurements, e.g., reference signal received power (RSRP) measurements for the active beam and/or candidate beam RRS(s). The described techniques may also employ other beam-related reference signals, such as BRSs, that may be used to obtain or otherwise identify potential candidate beams. In some aspects, the active beam may initially be selected from a BRS beam, e.g., a BRS beam used during a BRS procedure. In certain aspects, the described techniques provide for defining a beam state for the active beam that may be used to compare among beam choices available through other reference signals, such as BRS. Similarly, the UE may perform and report RSRP measurement on a received CSI-RS, or a subset of resources of a CSI-RS, in order to provide a comparison amongst various beam choices.

In some aspects, a UE may use an active beam RRS to refine the active beam at the UE to improve wireless communications. The base station may be communicating with the UE on the active beam and perform a refinement procedure with the UE. The base station may select RRS(s) that include the active beam RRS. The active beam RRS may correspond to the active beam, e.g., may be associated with the same resource identifier (ID), use the same antenna ports for transmission, etc. That is, the antenna ports used for transmitting the active beam RRS may be quasi-co-located (QCL) with the antenna ports used for transmitting control signals or data using the active beam. The UE may receive the RRS(s), that include the active beam RRS, identify that the active beam RRS is associated with the active beam, and perform beam state measurements on the active beam RRS and other RRSs, when present. The beam state measurements may include determining a RSRP for the active beam RRS and other RRSs, when present. In some aspects, the beam state measurements may include determining the RSRP of the active beam RRS using different antenna array configurations of the UE (e.g., different UE receive configurations) to determine a maximum achievable RSRP of the active beam RRS. The UE may refine the active beam using the beam state measurement on the active beam RRS, e.g., may adjust which antenna array(s), receive chains, and/or antenna array configurations are used to receive the active beam transmitted from the base station. The UE may, in some aspects, transmit a beam state measurement report to the base station that includes an indication of the beam state measurements for the active beam RRS and other RRSs, when present. The UE may, in some aspects, transmit an indicator to the base station that it has refined the active beam of the UE.

Aspects of the disclosure are further illustrated by and described with reference to apparatus diagrams, system diagrams, and flowcharts that relate to beam refinement procedures in mmW communications.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE) (or LTE-Advanced) network. In some examples, the wireless communication system 100 may be an advanced wireless communication system operating in the millimeter wave spectrum, e.g., a mmW wireless communication system.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. UEs 115 may be dispersed throughout the wireless communication system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communication system 100 may operate in an ultra-high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Specifically, wireless communication system 100 may operate in mmW frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device, such as a UE 115, may select a beam direction for communicating with a network by selecting the strongest beam from among a number of reference signals transmitted by a base station. In one example, the reference signals may be BRSs transmitted from the base station 105 during a BRS procedure. The BRS procedure may be cell-specific, e.g., may be directed in incremental directions around the coverage area 110 of the base station 105. The BRS procedure may be used, at least in certain aspects, to establish an active beam for beamformed transmissions between the base station 105 and a UE 115.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Wireless communication system 100 may be or include a multicarrier mmW wireless communication system. Broadly, aspects of wireless communication system 100 may include a UE 115 and a base station 105 using RRS(s) for UE 115 refinement of the active beam. For example, a base station 105 may receive a beam state measurement report from a UE 115. The beam state measurement report may include or convey an indication of beam state information for BRSs transmitted during a BRS procedure. Base station 105 may select RRS(s) for transmission to UE 115. In some aspects, base station 105 may select the RRS(s) based on a previously received beam state measurement report received from UE 115. In some aspects, at least one of the RRS(s) may be an active beam RRS that corresponds to the active beam being used for wireless communications. In some examples, the beam state measurement report may include a UE receive configuration of UE 115 and base station 105 may select an RRS transmission configuration based on the UE receive configuration. Base station 105 may transmit the RRS(s) to UE 115 and, in some examples, an indication of the active beam RRS. In other cases, the active beam RRS may be identified by its port configuration, for example.

From the UE 115 perspective, the UE 115 may perform the BRS procedure with base station 105. The BRS procedure may include UE 115 transmitting the beam state measurement report to base station 105. The beam state measurement report may include beam state information (BSI) for the BRSs received during the BRS procedure. UE 115 may receive RRS(s) from base station 105 during a refinement procedure. The RRS(s) may include the active beam RRS. UE 115 may identify the active beam RRS that corresponds to the active beam and perform a beam state measurement of the active beam RRS and other RRSs, when present. UE 115 may refine the active beam based on the beam state measurement of the active beam RRS. In some aspects, UE 115 may receive an indication from base station 105 associating antenna port(s) of the RRS(s) with a prior reference signal, e.g., a prior BRS and/or CSI-RS. UE 115 may receive antenna port(s) of the RRS(s) using an antenna configuration used for receiving the prior reference signals. In some aspects, UE 115 may receive the RRS(s) transmitted in accordance with the RRS transmission configuration.

Figure 2:
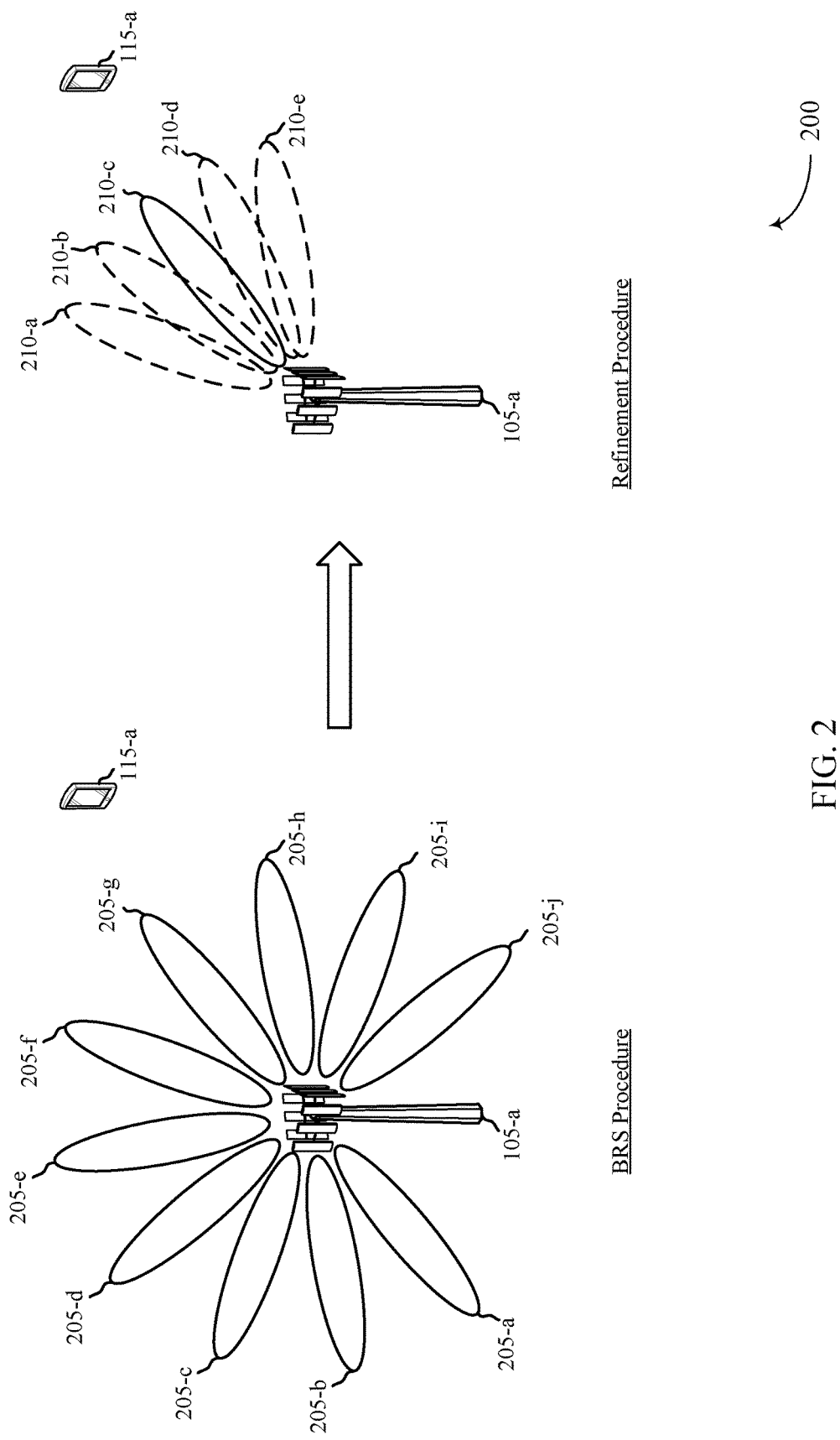
FIG. 2 illustrates an example of a wireless communication system that supports beam refinement for active and candidate beams in accordance with aspects of the present disclosure.

FIG. 2 illustrates an example of a wireless communication system 200 for beam refinement for active and candidate beams. Wireless communication system 200 may be an example of aspects of wireless communication system 100 of FIG. 1. Wireless communication system 200 may be a mmW wireless communication system. Wireless communication system 200 may include a UE 115-a and a base station 105-a, which may be examples of the corresponding devices of FIG. 1. Broadly, wireless communication system 200 illustrates aspects of a refinement procedure for UE 115-a refinement of an active beam used for beamformed transmissions between the base station 105-a and the UE 115-a.

In some examples, base station 105-a may be a serving base station for UE 115-a. Base station 105-a may be a mmW base station that transmits beamformed transmissions on an active beam to UE 115-a. The transmissions from base stations 105-a may be beamformed or directional transmissions that are directed towards UE 115-a.

For example, base station 105-a may initially perform a BRS procedure with UE 115-a to establish an active beam for beamformed transmissions. The BRS procedure may include base station 105-a transmitting a plurality of BRSs 205. BRSs 205 may be transmitted in a beamformed or directional manner where each BRS 205 is transmitted in a different direction. For example, BRS 205-a may be transmitted in a first direction, BRS 205-b may be transmitted in a second direction, and so on. Thus, base station 105-a may transmit a sufficient number of BRSs 205 and/or at sufficient directional spacing, to cover the entire coverage area of base station 105-a.

In some aspects, the BRSs 205 may be considered as non-UE specific reference signals, e.g., BRSs 205 may be broadcast by base station 105-a and received by any UE within the coverage area of base station 105-a. The BRS procedure may be used by base station 105-a, UE 115-a, and other UEs within the coverage area of base station 105-a to establish an initial active beam for communications between base station 105-a and the UEs. For example, UE 115-a may measure and report a received signal strength of certain BRSs 205 to base station 105-a. In one example, UE 115-a may report the three highest receive signal strengths measured from BRSs 205, e.g., BRS 205-f, BRS 205-g, and BRS 205-h. Base station 105-a may use the reported signal strength measurements to select and assign the active beam for beamformed transmissions to the UE 115-a. In the example of FIG. 2, BRS 205-g may be selected as the active beam for beamformed transmissions between base station 105-a and UE 115-a.

In certain aspects, each BRS 205 may be associated with a particular resource ID. The resource ID may be associated with the antenna ports of the base station 105-a, in some examples. For example, an active resource ID may be associated with the antenna port(s) of the active beam, e.g., BRS 205-g. The UE 115-a may identify the resource ID associated with each BRS 205, e.g., through base station 105-a signaling, based on decoding the BRS 205, based on radio resource control (RRC) configuration setup, and/or based on preconfigured information. Thus, base station 105-a may provide an indicator to UE 115-a associating at least one or each antenna port(s) for the BRSs 205 (e.g., prior reference signals) with a resource ID. Although the described techniques generally discuss use of a BRS, it can be appreciated that other reference signals may also be used, e.g., CSI-RSs.

In some aspects, the BRS procedure may include UE 115-a transmitting and base station 105-a receiving a beam state measurement report. The beam state measurement report may include BSI for the BRSs 205 (e.g., BSI for the previously received reference signals). The BSI may include or otherwise convey an indication of the received signal strength for one or more of BRSs 205. For example, the beam state measurement report may include a received signal strength of BRSs 205-f, 205-g, and 205-h. The order of BRSs 205 being reported in the beam state measurement report may be based on the RSRP of each reported BRS 205, based on the resource ID associated with each reported BRS, based on a sequential listing or order of each reported BRS 205, etc.

In some examples, the beam state measurement report may include information associated with or otherwise indicative of a UE receive configuration for UE 115-a. In some aspects, the UE receive configuration may include or be indicative of the number of antenna arrays of UE 115-a. In some aspects, the UE receive configuration may include or be indicative of the number of receive chains that UE 115-a supports. In some aspects, the UE receive configuration includes or is indicative of the number of supported receive beams of UE 115-a. The UE receive configuration may be used by base station 105-a to select an RRS transmission configuration.

Based on the BRS procedure, base station 105-a and UE 115-a may be communicating using beamformed transmissions on the active beam, e.g., on an active beam that corresponds to BRS 205-g. Periodically and/or as needed, base station 105-a and UE 115-a may perform a refinement procedure to refine the active beam, e.g., to modify aspects of beamformed transmission on the active beam and/or to select a candidate beam as a new active beam. In some aspects, the refinement procedure may be considered UE specific, e.g., targeted to a particular UE and/or group of UEs located near each other.

Broadly, the refinement procedure may include base station 105-a linking an active beam RRS to the active beam. For example, UE 115-a and base station 105-a may be communicating, e.g., base station-to-UE communications using a beam formed by using one or more antenna ports. The beam may be referred to as the active beam. Base station 105-a may determine to transmit RRSs 210 (e.g., BRRSs) to refine the UE 115-a active beam, and possibly offer potential candidate beams. Base station 105-a may determine that the subset of RRS antenna ports used for transmitting the active beam RRS 210-c may correspond to the antenna ports of the active beam and transmit the active beam RRS 210-c using this subset of antenna ports. UE 115-a may refine or find the RRSs 210 corresponding to the active beam and measure the beam state measurement for the active beam RRS 210-c and candidate beam RRS beams 210. UE 115-a may determine the subset of RRS 210 antenna ports that corresponds to the antenna ports of the active beam and determine the active beam RRS 210-c corresponding to the active beam. UE 115-a may determine the refined beam state information of the UE active beam using the active beam RRS 210-c received on the subset of antenna ports of the RRSs 210.

In some aspects, the refinement procedure may include base station 105-a transmitting one, or more than one RRSs 210. Base station 105-a may select the RRSs 210 to use during the refinement procedure. The RRS 210 may include an active beam RRS that corresponds to the active beam, e.g., RRS 210-c that corresponds to the active beam being used for beamformed transmissions. In some examples, the refinement process may include only the active beam RRS 210-c. In other examples, the refinement process may include the active beam RRS 210-c and other candidate beams (e.g., RRSs 210-a, 210-b, 210-d, and/or 210-e). Each RRS 210 may be associated with a resource ID, e.g., an index or indicator indicative of the antenna ports or antenna configuration used to transmit the RRS 210. In one example, the active beam RRS 210-c may be associated with the same resource ID as the active beam (e.g., the same resource ID used for BRS 205-g beam). In some aspects the one or more of RRSs 210 may correspond to BRSs 205 and/or CSI-RSs, e.g., previously received reference signals.

In some aspects, the refinement process may include base station 105-a transmitting, in addition to the active beam RRS 210-c, other RRSs 210, which may also be considered candidate beams. In some cases, one or more of the candidate beams may correspond to one or more of the BRSs 205 transmitted during the BRS procedure. The resource IDs corresponding to BRSs 205 may be mapped to resource IDs for RRSs 210. For example, RRS 210-a may correspond to BRS 205-f and RRS 210-e may correspond to BRS 205-h. Accordingly, some cases may include base station 105-a transmitting an indicator to UE 115-a associating the one or more of the RRSs 210 with the prior reference signals (e.g., the BRSs 205 that were transmitted during the BRS procedure). In the example where each RRS 210 corresponds to a previous BRS 205, the base station 105-a may transmit to UE 115-a an indicator associating each of the RRSs 210 with the corresponding prior BRSs 205. In some examples, the indicator associated with the RRSs 210 and/or BRSs 205 may be conveyed in an RRC configuration procedure performed with base station 105-a. For example, the resource IDs associated with each supported reference signal may be indicated to UE 115-a from base station 105-a.

In other aspects, one or more of the RRSs 210 may be new beam options, e.g., RRSs 210-b and/or 210-d. The new beam options may be associated with a change in the direction, amplitude, and/or shape of the active beam, etc.

In some aspects, UE 115-a may receive an indicator associating antenna port(s) of some and/or all of the RRSs 210 with prior reference signals (e.g., BRSs 205 and/or CSI-RSs) transmitted from base station 105-a. Thus, UE 115-a may receive the RRSs 210 using an antenna configuration based on the antenna configuration used to receive the prior reference signals. As one example, each antenna port of RRS 210 may be associated with a previously transmitted BRS 205. For example, RRS 210 may use two antenna ports (e.g., port 0 and port 1). In one example, port 0 of RRS 210 may be associated with BRS 205 beam identifier 50 and port 1 of RRS 210 may be associated with BRS 205 beam identifier 71. As another example, each port of RRS 210 may be associated with the same BRS 205 beam identifier, e.g., beam identifier 50. In this case, one BRS 205 beam identifier may be associated with all of the antenna ports used for RRS 210 transmission.

In some aspects, the RRSs 210 may be transmitted in a predetermined order. For example, the predetermined order may be based on a beam state measurement report received from UE 115-a, e.g., during the BRS procedure. In some aspects, the predetermined order may correspond to the order of the BSI for the BSRs 205 from the beam state measurement report. In some aspects, the predetermined order may be based on the RSRP of the BSRs 205 received during the BRS procedure, e.g., strongest RSRP to weakest RSRP, or vice versa. In some aspects, the predetermined order may be a sequential order. The sequential order may include transmitting the RRSs 210 during a certain symbol, or symbols, in accordance with the sequential order.

UE 115-a may identify the active beam RRS 210-c as corresponding to the active beam. For example, UE 115-a may determine that the resource ID associated with active beam RRS 210-c is the same or substantially the same as the resource ID associated with the active beam. In some aspects, the resource ID for the active beam RRS 210-c may be conveyed or otherwise indicated via the RRC configuration procedure. In some aspects, the resource ID may be associated with an antenna port configuration used by base station 105-a for transmission of the active beam RRS 210-c and the active beam. In some aspects, identifying the active beam RRS 210-c may include identifying antenna port(s) associated with the active beam RRS 210-c based on an antenna port configuration of the active beam. For example, UE 115-a may identify which antenna ports are used to transmit the active beam RRS 210-c and compare this information to the antenna port configuration being used for the active beam. In some aspects the antenna port configuration used to transmit the active beam RRS 210-c and the active beam may be associated with the same resource ID.

In some examples, base station 105-a and UE 115-a may determine the correspondence between active beam RRS 210-c and the active beam in accordance with various aspects. In one aspect, the antenna port(s) of the active beam may be mapped sequentially to the first RRS 210 port(s). For example, if the active beam comprises two antenna ports, the first two ports used to transmit the RRSs 210 may be selected to correspond to the active beam antenna ports. Accordingly, base station 105-a may avoid explicitly signaling an indication to UE 115-a of which antenna ports of the RRSs 210 correspond to the active beam antenna ports. As one example, if the active beam comprises P antenna ports, then the RRS 210 antenna ports "$\{N, \ldots, N+P-1\}$ mod M" (where M may refer to the maximum number of RRS 210 antenna ports) correspond to the active beam antenna ports. In this example, N may be a UE-specific RRC parameter configured by base station 105-a that permits multiplexing different UEs in one refinement procedure using RRSs 210. N may be configured during the RRC configuration procedure of RRSs 210. In some examples, N may be set to "0" for all UEs, e.g., when the antenna ports are mapped sequentially to the active beam antenna ports. In another example, a fixed mapping may be used to associate the antenna port(s) of the active beam with the RRS 210 antenna port numbers.

In some examples, base station 105-a and UE 115-a may determine the correspondence between active beam RRS 210-*c* and the active beam in accordance with various aspects. For example, for each RRS 210 beam transmitted by base station 105-*a*, base station 105-*a* may transmit an indication to UE 115-*a* as to which UE beam might work well for each RRS 210 beam. This may be particularly helpful for short refinement sessions where UE 115-*a* has a limited opportunity to explore the beam choices. Base station 105-*a* may transmit the indication by identifying, for each RRS 210 beam, a BRS 205 beam that is similar to the RRS 210 beam. Then, UE 115-*a* may explore around the beam it used for the BRS 205 beam. In some aspects, base station 105-*a* may specify for each RRS 210 beam an associated beam ID of the RRS 210 beam, the BRS 205 beam may be similar to the RRS 210 beam.

In some aspects, base station 105-*a* may specify one BRS 205 beam for the entire RRS 210 beam transmission (instead of one BRS 205 beam for each RRS 210 beam). This may convey an indication that the RRS 210 carries beam candidates that are similar to the specified BRS 205. UE 115-*a* may then refine around the UE beam it used for receiving the earlier BRS 205 beam for the specified beam ID. Accordingly, UE 115-*a* may avoid blindly searching over all possible candidate RRS 210 beams.

In some aspects of beam refinement for the active beam RRS 210-*c*, UE 115-*a* may determine receive beams to measure based on the BRS 205 beam ID associated with the RRS 210. Thus, UE 115-*a* may report BSI for selected BRS 205 beams (e.g., BRS 205 beams with highest RSRP). Base station 105-*a* may select RRS 210 beams based on the received BRS report and transmit the RRS 210 in a predetermined order based on the BSI reports. The predetermined order may be the same order in which UE 115-*a* sent the reports, or in ascending or descending order of the BSI reports (e.g., based on RSRP values in BSI reports). In some aspects, RRS 210 beams may be mapped to RRS 210 resource IDs in the predetermined order, may be transmitted sequentially in the predetermined order, etc. In some aspects, each RRS 210 beam may be transmitted for a predetermined number of symbols during the refinement procedure.

In some aspects of beam refinement and beam state measurements, base station 105-*a* may use a downlink control indicator (DCI) to trigger a special refinement procedure—active refinement procedure—that uses only the active beam RRS 210-*c*. The trigger bits for a general refinement procedure may be repurposed to indicate the special refinement procedure, e.g., since not all options of a general refinement procedure are relevant to active refinement procedure. Other configurations, such as higher layer parameters, for the active refinement procedure may be fixed to predetermined values. For example, a resource allocation type of special refinement procedure may be fixed or limited to one or two symbols, curtailing using other resource types. In some aspects, base station 105-*a* may configure UE 115-*a* with multiple refinement procedures, and may select one of the refinement procedures using the DCI trigger. In this example, one of the refinement procedures may be reserved as an active refinement procedure. For the other refinement procedures, UE 115-*a* may not know which RRS 210 antenna ports correspond to the ports of the active beam, and the active refinement procedure may use only the ports corresponding to the active beam.

In some aspects, base station 105-*a* may configure RRSs 210 resource IDs, where each resource ID may include the RRS 210 antenna port(s). A predetermined resource ID may be associated with the antenna port(s) of the active beam. The configured resource IDs other than the predetermined resource IDs may be associated with the antenna port(s) of the candidate beams RRSs 210. In one example, base station 105-*a* may configure RRS 210 antenna port numbers that are included in the predetermined resource ID. For example, the active beam may use two antenna ports and the predetermined resource ID may be configured to carry ports three and four of RRSs 210. Then ports three and four may carry a reference for the two antenna ports used for the active beam.

In some aspects, base station 105-*a* may configure RRS 210 resource IDs, but no resource ID may be associated with the antenna port(s) of the active beam RRS 210-*c*. The configured resource IDs comprise the port(s) of the candidate beams.

UE 115-*a* may perform a beam state measurement on the RRSs 210 and transmit a beam state measurement report based on the beam state measurements of the RRSs 210. The beam state measurements may include measurement of the RSRP for each RRS 210. The UE 115-*a* may perform the beam state measurement on the active beam RRS 210-*c*, for example, at a minimum. UE 115-*a* may perform beam state measurements on other candidate RRSs 210, when present (e.g., RRSs 210-*a*, 210-*b*, 210-*d*, and/or 210-*e*).

UE 115-*a* may transmit the beam state measurement report to base station 105-*a*. The beam state measurement report may include information indicative of the beam state measurements performed by UE 115-*a* on the RRSs 210, e.g., the RSRP of the active beam RRS 210-*c* and of other RRSs 210, when present. The beam state measurement report may include an index associated with the resource ID associated with the RRSs 210, e.g., an index associated with the active beam RRS 210-*c*. In other examples, the beam state measurement report associated with the active beam RRS 210-*c* may not include an index associated with the resource ID.

In some cases, UE 115-*a* may transmit a refined beam state information (R-BSI) for the active beam RRS 210-*c* and for candidate beams RRS 210, when present. In one aspect, UE 115-*a* may report the R-BSI of the active beam and identify this R-BSI using the index of the predetermined RRS 210 resource ID. In one aspect, UE 115-*a* may report the R-BSI of the active beam without any RRS 210 resource IDs, whereas UE 115-*a* may include the RRS 210 resource ID with an R-BSI report associated with resource IDs of the candidate beam RRS 210*s*.

Some aspects of how UE 115-*a* transmits the beam state measurement report may include UE 115-*a* determining the beam state information by measuring the RSRP of the active beam RRS 210-*c* that corresponds to the antenna ports being used to transmit the active beam (e.g., the antenna ports included in the resource ID denoting the active beam). In some aspects, UE 115-*a* may use the RSRP measurement from the received active beam RRS 210-*c* port(s) corresponding to the antenna ports used for the active beam as the RSRP of the active beam for comparison with the RSRP of other beam choices, e.g., in various beam management protocols. The UE may also use RSRP for measurement report triggering.

In some aspects, UE 115-*a* may use several antenna arrays and/or antenna port configurations of the UE 115-*a* to perform the beam state measurements of the RRSs 210. For example, UE 115-*a* may use different configurations for the antenna arrays to determine which antenna array configuration results in the highest RSRP on the active beam RRS 210-*c*. The number of different antenna arrays and/or port configurations that UE 115-*a* can use to measure the RSRP of the active beam RRS 210-*c* may depend on the length of the refinement procedure and/or the number of active beam RRS 210-c transmissions that occur during the refinement procedure. In some examples, where multiple active beam RRSs 210-c are transmitted during the refinement procedure (e.g., during multiple symbols), UE 115-a may use multiple receive beams (e.g., multiple instances of the active beam RRS 210-c) to receive the active beam RRS 210-c.

UE 115-a may refine the active beam based on the beam state measurement performed on the active beam RRS 210-c. For example, the UE 115-a may identify refined beam state information of the active beam and use the refined beam state information to adjust the active beam used by the UE 115-a. UE 115-a may identify refined beam state information of the multiple receive beams and use the refined beam state information to adjust the active beam.

Refining the active beam used by UE 115-a may include UE 115-a changing one or more antenna array configurations used for receiving the active beam from base station 105-a. In one example, UE 115-a may refine the active beam used by UE 115-a at a predetermined time after the refinement process that is known by UE 115-a and base station 105-a. In another example, UE 115-a may refine the active beam used by UE 115-a based on an indicator transmitted to base station 105-a indicative of the adjustment of the active beam.

Refining the active beam may be based on an authorization previously receive from base station 105-a. For example, UE 115-a may receive an active beam refinement authorization from base station 105-a and refine the active beam based on the active beam refinement authorization. The active beam refinement authorization may be received during an RRC configuration procedure, in some examples. Thus, base station 105-a may determine which UEs (e.g., UE 115-a) within its coverage area may refine the active beam.

In some aspects, refining the active beam may include UE 115-a applying the refined active beam corresponding to the active beam for subsequent communications with base station 105-a. In some aspects, UE 115-a may apply the refined beam corresponding to the active beam at a predetermined time that is known by base station 105-a, e.g., preconfigured and/or previously signaled. In some aspects, UE 115-a may apply the refined beam after reporting the R-BSI to base station 105-a, e.g., in a beam state measurement report. In some aspects, base station 105-a may enable/disable autonomous refined beam application by UE 115-a, e.g., using the active beam refinement authorization.

In some aspects of refining the active beam, during refinement procedure, UE 115-a may search over a number of candidate UE beams to find a best UE beam corresponding to each BS beam, e.g., each RRSs 210. The number of UE beams UE 115-a explores may depend on the length of the refinement session, e.g., a longer refinement session may provide more candidate UE beams for the UE to explore. For example, UE 115-a may first refine around the beam it currently uses for the active beam, before exploring other UE beam options. That is, UE 115-a may explore first the UE beams that are similar to the beam the UE uses for active beam.

In some aspects, UE 115-a may use the R-BSI of the best RRS 210 beam from the refinement procedure, e.g., the RRS 210 beam having the best RSRP, for triggering measurement reports such as events A1-A6 that correspond to LTE configurations.

Thus, certain aspects the refinement procedure may include base station 105-a transmitting RRSs 210, which includes active beam RRS 210-c, that UE 115-a may use to adjust and refine its active beam. UE 115-a may also use the RRSs 210 to perform beam state measurements, e.g., RSRP measurements. The active beam used for communication may initially be picked from a BRS 205 but, over time, due to refinement at both base station 105-a and UE 115-a, the active beam may differ from any beam offered during the BRS procedure, e.g., from BRSs 205 transmitted during the BRS procedure. Therefore, the refinement procedure defines a beam state for the active beam that may be used to compare among beam choices available through other reference signals, such as BRS. Moreover, UE 115-a may perform and report RSRP measurement on received CSI-RSs, or subset of resources of CSI-RSs, in order to provide a comparison amongst various beam choices.

In one aspect, RRSs 210 transmission to UE 115-a may include only the active beam RRS 210-c and UE 115-a may refine its beam for the currently used active beam. In another aspect, RRS 210 transmissions to UE 115-a may include the active beam RRS 210-c and one or more candidate beams, e.g., RRSs 210-a, 210-b, 210-d, and/or 210-e. In this case, UE 115-a may refine or find a beam corresponding to each beam transmitted by base station 105-a.

Upon refinement of the active beam, UE 115-a may apply the refined beam for subsequent communications using beamformed transmissions on the active beam. UE 115-a may also report the R-BSI, such as RSRP, of the refined active beam. Upon refinement of candidate beams, UE 115-a may record the refined beams corresponding to the one or more candidate beams and report to base station 105-a the beam states, such as RSRP, for a subset of candidate beams. Subsequently, base station 105-a may trigger a beam switch to apply a candidate beam for active beam and indicate to UE 115-a to apply the corresponding refined beam.

UE 115-a may determine the R-BSI using the RRSs 210 transmitted from the ports corresponding to the ports of the active beam. R-BSI may include an RSRP measurement, in some examples. UE 115-a may use this RSRP measurement—alone or filtered and/or combined with past measurements—wherever it needs to compare the strength of active beam with other beam choices, such as candidate beams or beams transmitted during the BRS procedure.

In some examples, UE 115-a may convey to base station 105-a various UE receive configuration information. For example, UE 115-a may convey to base station 105-a an indication of the number of physical subarrays of UE 115-a, the number of receive chains of UE 115-a, and/or the number of receive RRS 210 beams that UE 115-a supports. The duration of the refinement procedure—e.g., the length of RRS 210 transmission from base station 105-a during the refinement procedure—may depend on the amount of time a UE 115-a uses to complete refinement of its beam. The time UE 115-a uses may in turn depend on the number of physical subarrays, number of receive chains, and number of receive beam choices for each subarray.

Thus, communicating this configuration information to base station 105-a may be useful for base station 105-a to determine a refinement procedure configuration. In one aspect, UE 115-a may include in a beam state measurement report associated with a BRS 205 beam, an indication of the UE 115-a antenna array used for the reception of the BRS 205 beam. Base station 105-a may use this information to determine which RRS 210 beams to transmit simultaneously (e.g., because they are expected to be received on the same array) and which RRS 210 beams to transmit in a time division multiplexing (TDM) manner. Base station 105-a may determine some elements of the refinement procedure configuration based on the above provided information. For example, elements of refinement procedure configuration may include the duration of RRS 210 transmission, e.g., 1 OFDM symbol, 5 OFDM symbols, etc. In another example, elements of the refinement procedure configuration may include the RRS 210 beams that are simultaneously transmitted during the refinement procedure, e.g., suppose UE 115-a has two receive chains and therefore can receive on two arrays simultaneously. Then during the refinement procedure, base station 105-a may simultaneously transmit only those RRS 210 beams that are expected to be simultaneously received by UE 115-a based on the above provided information.

Figure 3:
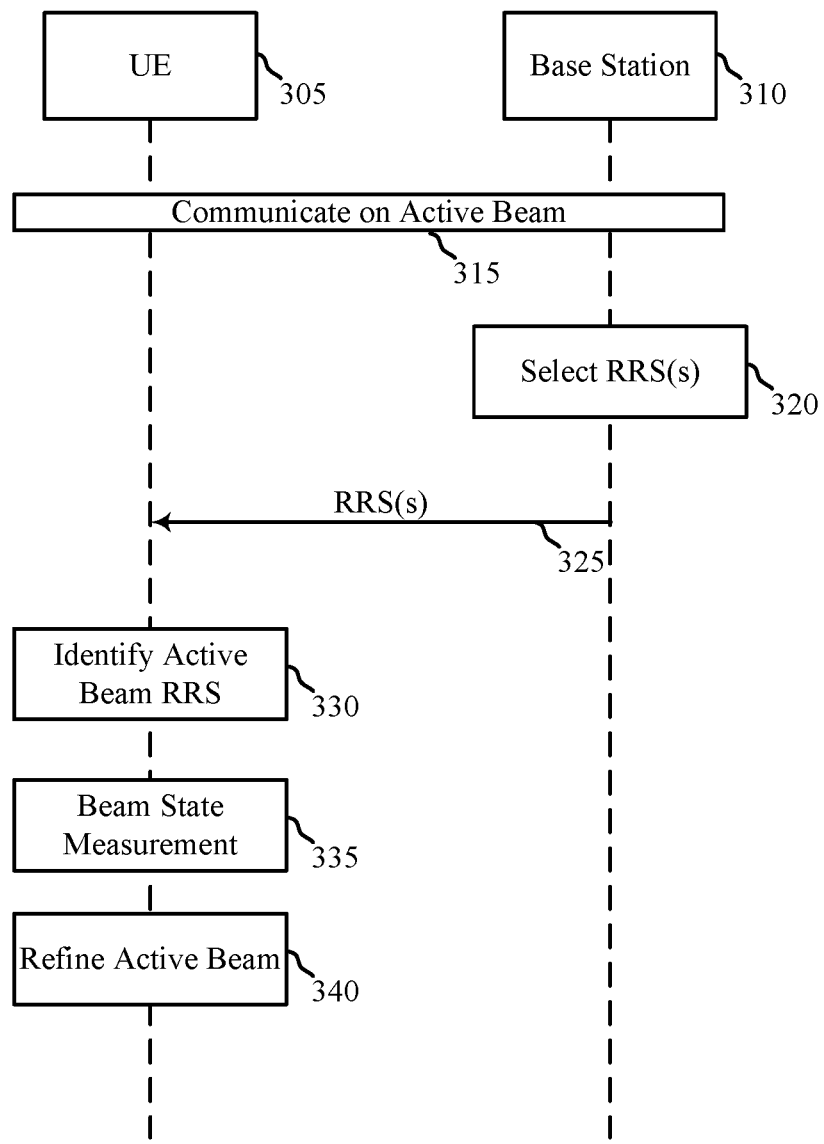
FIG. 3 illustrates an example of a process flow that supports beam refinement for active and candidate beams in accordance with aspects of the present disclosure.

FIG. 3 illustrates an example of a process flow 300 for beam refinement for active and candidate beams. Process flow 300 may implement aspects of wireless communication system 100 and/or 200 of FIGS. 1 and/or 2. Process flow 300 may include a UE 305 and a base station 310, which may be examples of the corresponding devices of FIGS. 1 and/or 2. Base station 310 may be a mmW base station and a serving base station for UE 305.

At 315, UE 305 and base station 310 may communicate using beamformed transmission(s) on an active beam. The active beam may be selected based at least in certain aspects using a BRS procedure, as discussed with reference to FIG. 2. The active beam may be associated with a resource ID, e.g., an active beam resource ID associated with the antenna ports configuration used by base station 310 to transmit the active beam.

At 320, base station 310 may select RRS(s) for transmission to UE 305. The RRS(s) may include an active beam RRS that corresponds to the active beam. For example, the active beam RRS may use the same antenna port configuration as is used by base station 310 for transmission of the active beam.

At 325, base station 310 may transmit the RRS(s) including the active beam RRS to UE 305. In some examples, base station 310 may convey an indication of the resource ID associated with the active beam RRS and the active beam, e.g., convey an antenna port configuration used to transmit the active beam RRS.

At 330, UE 305 may, after receiving the RRS(s) including the active beam RRS, identify the active beam RRS as corresponding to the active beam. The identification may be based on a resource ID associated with the active beam RRS. The indication of the resource ID may be conveyed by base station 310, in some examples. In some aspects, identifying the active beam RRS as corresponding to the active beam may include UE 305 identifying antenna port(s) associated with the active beam RRS based on the antenna port configuration of the active beam.

At 335, UE 305 may perform beam state measurements on the RRS(s), and at least on the active beam RRS. The beam state measurements may include determining the RSRP for each RRS received from base station 310.

At 340, UE 305 may refine the active beam based on the beam state measurement of the active beam RRS. For example, refining the active beam may include adjusting one or more aspects of the antenna array(s) used for receiving the active beam.

Figure 4:
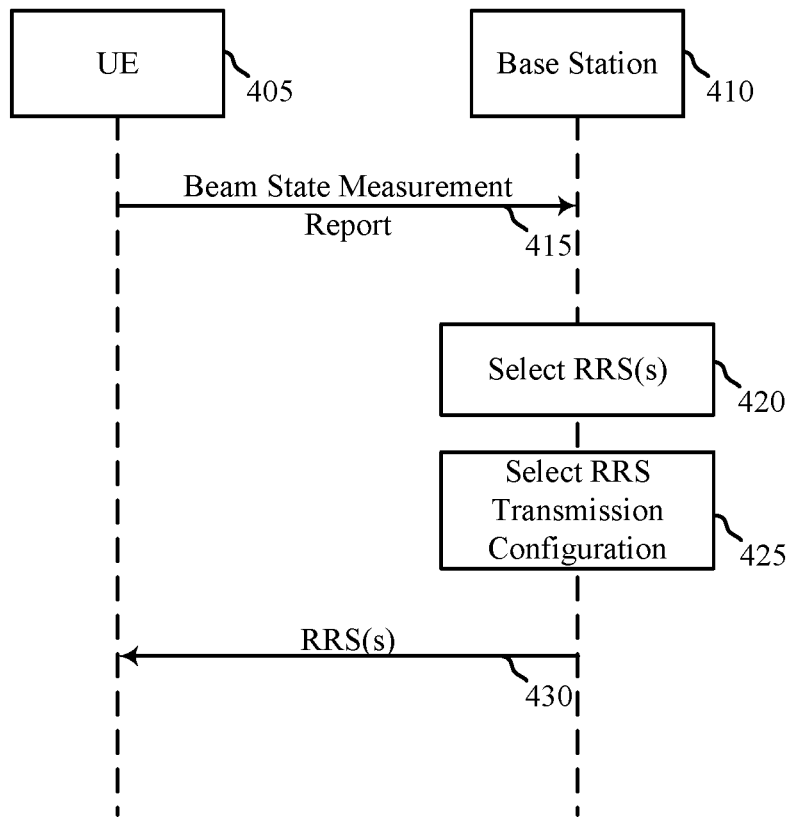
FIG. 4 illustrates an example of a process flow that supports beam refinement for active and candidate beams in accordance with aspects of the present disclosure.

FIG. 4 illustrates an example of a process flow 400 for beam refinement for active and candidate beams. Process flow 400 may implement aspects of wireless communication system 100 and/or 200 of FIGS. 1 and/or 2. Process flow 400 may implement aspects of process flow 300 of FIG. 3. Process flow 400 may include a UE 405 and a base station 410, which may be examples of the corresponding devices of FIGS. 1 and/or 2. Base station 410 may be a mmW base station and a serving base station for UE 405.

At 415, UE 405 may transmit a beam state measurement report to base station 410. The beam state measurement report may include BSI for a predetermined number of previously transmitted BRSs. The beam state measurement report may also include or convey an indication of UE receive configuration for UE 405. The UE receive configuration may include an indication of the number of physical antenna arrays of UE 405, the number of receive chains of UE 405, and/or an indication of the number of supported of receive beams of UE 405.

At 420, base station 410 may select RRS(s) for transmission to UE 405. In some examples, the RRS(s) may include an active beam RRS that corresponds to the active beam. The active beam RRS may use the same antenna port configuration as is used by base station 310 for transmission of the active beam.

At 425, base station 310 may select a RRS transmission configuration based on the UE receive configuration. The RRS transmission configuration may include or be based on transmitting the RRS(s) in a predetermined order (e.g., in a TDM configuration), transmitting the RRS(s) for a predetermined duration (e.g., a predetermined number of symbols), transmitting the RRS(s) during the same symbol, etc.

At 430, base station 410 may transmit the RRS(s) (which may include the active beam RRS, in some examples) to UE 405. In some examples, base station 410 may convey an indication of the resource ID associated with the active beam RRS and the active beam, e.g., convey an antenna port configuration used to transmit the active beam RRS.

Figure 5:
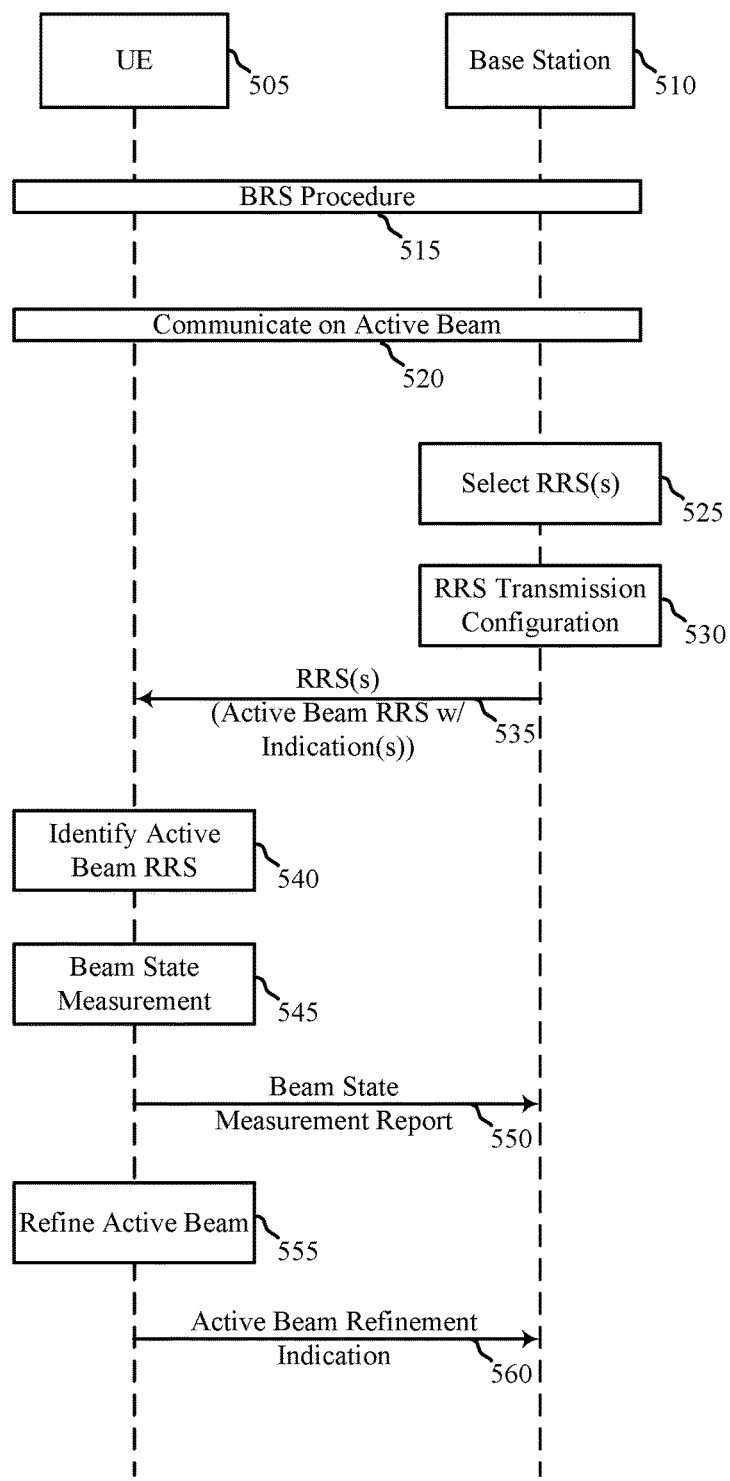
FIG. 5 illustrates an example of a process flow that supports beam refinement for active and candidate beams in accordance with aspects of the present disclosure.

FIG. 5 illustrates an example of a process flow 500 for beam refinement for active and candidate beams. Process flow 500 may implement aspects of wireless communication system 100 and/or 200 of FIGS. 1 and/or 2. Process flow 500 may implement aspects of process flows 300 and/or 400 of FIGS. 3 and 4. Process flow 500 may include a UE 505 and a base station 510, which may be examples of the corresponding devices of FIGS. 1 and/or 2. Base station 510 may be a mmW base station and a serving base station for UE 505.

At 515, UE 505 and base station 510 may perform a BRS procedure. The BRS procedure may be an example of the BRS procedure described with reference to FIG. 2. The BRS procedure may be a non-UE specific BRS procedure where base station 510 transmits BRSs in a directional manner around the coverage area of base station 510.

At 520, UE 505 and base station 510 may communicate using beamformed transmission(s) on an active beam. In some cases, the active beam may be selected using the BRS procedure performed at 515. The active beam may be associated with a resource ID, e.g., an active beam resource ID associated with the antenna ports configuration used by base station 510 to transmit the active beam.

At 525, base station 510 may select RRS(s) for transmission to UE 505. The RRS(s) may include an active beam RRS that corresponds to the active beam. For example, the active beam RRS may use the same antenna port configuration as is used by base station 310 for transmission of the active beam.

At 530, base station 510 may select a RRS transmission configuration based on a UE receive configuration, e.g., UE receive configuration indicated in a beam state measurement report received from UE 505 during the BRS procedure. The UE receive configuration may include an indication of the number of physical antenna arrays of UE 505, the number of receive chains of UE 505, and/or an indication of the number of supported receive beams of UE 505. The RRS transmission configuration may include or be based on transmitting the RRS(s) in a predetermined order (e.g., in a TDM configuration), transmitting the RRS(s) for a predetermined duration (e.g., a predetermined number of symbols), transmitting the RRS(s) during the same symbol, etc.

At 535, base station 510 may transmit the RRS(s) (which may include the active beam RRS, in some examples) to UE 505. In some examples, base station 510 may convey an indication of the resource ID associated with the active beam RRS and the active beam, e.g., convey an antenna port configuration used to transmit the active beam RRS. Transmission of the RRSs may be in accordance with the RRS transmission configuration. In some example, the indication may be conveyed in a separate message, e.g., an RRC message, prior to the transmission of the RRSs.

At 540, UE 505 may, after receiving the RRS(s) including the active beam RRS, identify the active beam RRS as corresponding to the active beam. The identification may be based on a resource ID associated with the active beam RRS. The indication of the resource ID may be conveyed by base station 510, in some examples. In some aspects, identifying the active beam RRS as corresponding to the active beam may include UE 505 identifying antenna port(s) associated with the active beam RRS based on the antenna port configuration of the active beam.

At 545, UE 505 may perform beam state measurements on the RRS(s), and at least on the active beam RRS. The beam state measurements may include determining the RSRP for each RRS received from base station 510. At 550, UE 505 may transmit a beam state measurement report to base station 510. The beam state measurement report may include an indication of the RSRP for each RRS received at 535. In some examples, the beam state measurement report may include an indication of the RSRP for the active beam RRS.

At 555, UE 505 may refine the active beam based on the beam state measurement of the active beam RRS. For example, refining the active beam may include adjusting one or more aspects of the antenna array(s) used for receiving the active beam. At 560, UE 505 may transmit an indication to base station 510 that UE 505 has refined the active beam based at least in part on the beam state measurement of the active beam RRS.

Figure 6:
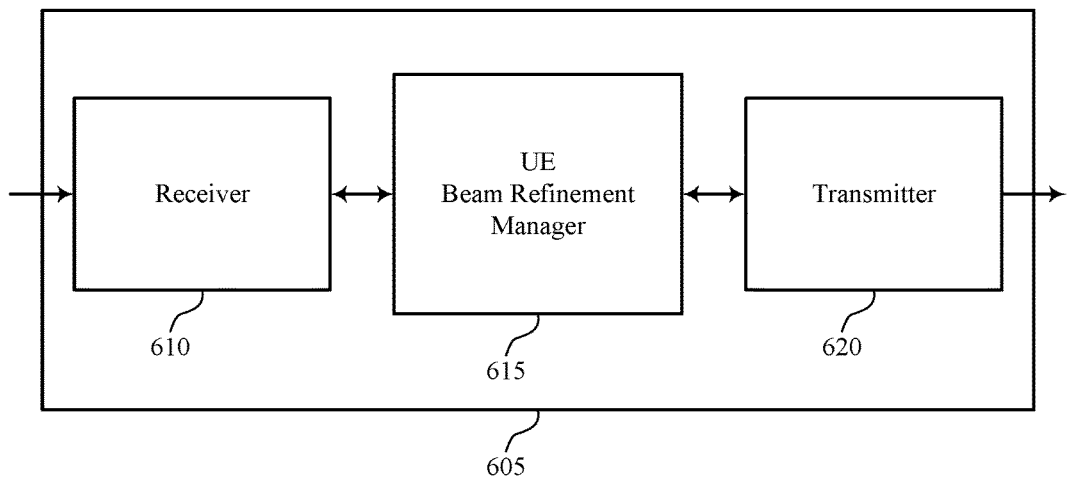
FIGS. 6 through 8 show block diagrams of a device that supports beam refinement for active and candidate beams in accordance with aspects of the present disclosure.

FIG. 6 shows a block diagram 600 of a wireless device 605 that supports beam refinement for active and candidate beams in accordance with various aspects of the present disclosure. Wireless device 605 may be an example of aspects of a UE 115 as described with reference to FIG. 1. Wireless device 605 may include receiver 610, UE beam refinement manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to beam refinement for active and candidate beams, etc.). Information may be passed on to other components of the device. The receiver 610 may be an example of aspects of the transceiver 935 described with reference to FIG. 9.

UE beam refinement manager 615 may be an example of aspects of the UE beam refinement manager 915 described with reference to FIG. 9. UE beam refinement manager 615 may communicate with a base station via one or more beamformed transmissions on an active beam, receive from the base station one or more RRSs, the one or more RRSs including an active beam RRS corresponding to the active beam, identify the active beam RRS as corresponding to the active beam, perform a beam state measurement on at least the active beam RRS, and refine the active beam based on the beam state measurement on the active beam RRS.

The UE beam refinement manager 615 may also receive, from a base station, an indicator associating one or more antenna ports of a RRS with a prior reference signal transmitted from the base station and receive, from the base station, the RRS using an antenna configuration based on an antenna configuration used for receiving the prior reference signal.

The UE beam refinement manager 615 may also receive, from a base station, an indicator associating each of one or more antenna ports of a RRS with a prior reference signal transmitted from the base station and receive, from the base station, the one or more ports of the RRS using an antenna configuration based on the antenna configuration used for receiving the prior reference signals.

The UE beam refinement manager 615 may also transmit, to a base station, a beam state measurement report including BSI for a predetermined number of previously transmitted BRSs, the beam state measurement report further including an indication of a UE receive configuration and receive one or more RRSs transmitted from the base station according to an RRS transmission configuration, where the one or more RRSs are selected based on the beam state measurement report.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
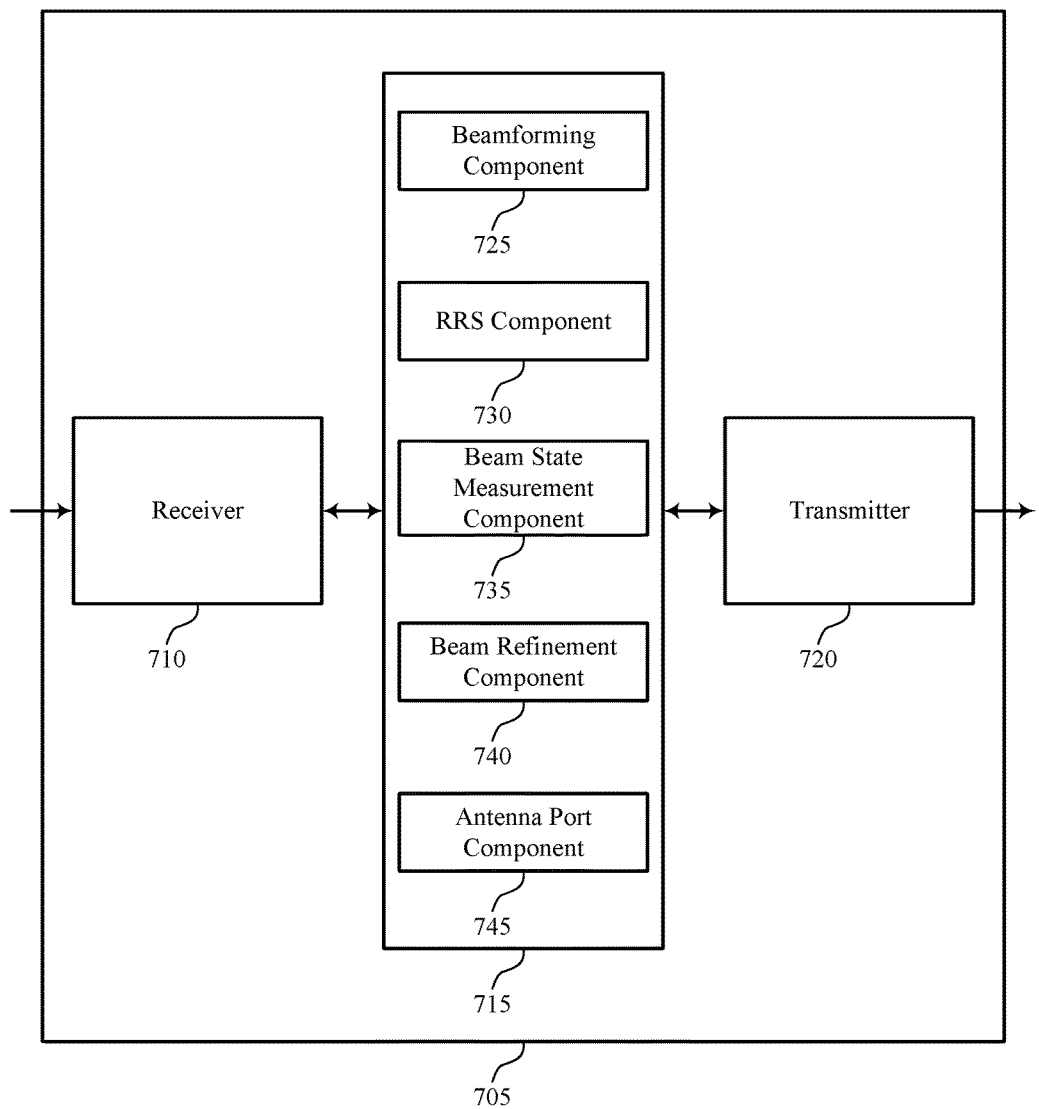

FIG. 7 shows a block diagram 700 of a wireless device 705 that supports beam refinement for active and candidate beams in accordance with various aspects of the present disclosure. Wireless device 705 may be an example of aspects of a wireless device 605 or a UE 115 as described with reference to FIGS. 1 and 6. Wireless device 705 may include receiver 710, UE beam refinement manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to beam refinement for active and candidate beams, etc.). Information may be passed on to other components of the device. The receiver 710 may be an example of aspects of the transceiver 935 described with reference to FIG. 9.

UE beam refinement manager 715 may be an example of aspects of the UE beam refinement manager 915 described with reference to FIG. 9. UE beam refinement manager 715 may also include beamforming component 725, RRS component 730, beam state measurement component 735, beam refinement component 740, and antenna port component 745.

Beamforming component 725 may communicate with a base station via one or more beamformed transmissions on an active beam. RRS component 730 may receive from the base station one or more RRSs. In some cases, the one or more RRSs include an active beam RRS corresponding to the active beam. In some cases, the RRS component 730 may receive at least a portion of the one or more RRSs during the same symbol.

RRS component 730 may also identify the resource ID based on an indication conveyed in a RRC configuration procedure performed with the base station. The RRS component 730 may also receive, from the base station, an indicator associating the one or more RRSs with a prior reference signal transmitted from the base station, and receive, from the base station, an indicator associating each of the one or more RRSs with a corresponding prior reference signal transmitted from the base station. RRS component 730 may identify the active beam RRS as corresponding to the active beam, as well as receive, from the base station, the RRS using an antenna configuration based on an antenna configuration used for receiving the prior reference signal RRS component 730 may also receive, from the base station, the one or more ports of the RRS using an antenna configuration based on the antenna configuration used for receiving the prior reference signals. Additionally, RRS component 730 may receive one or more RRSs transmitted from the base station according to an RRS transmission configuration, where the one or more RRSs are selected based on the beam state measurement report. Each of the one or more RRSs may be received in at least one of a predetermined order or according to a TDM configuration. RRS component 730 may transmit the one or more RRSs in accordance with the RRS transmission configuration includes receiving each of the one or more RRSs for a predetermined duration.

In some cases, identifying the active beam RRS as corresponding to the active beam includes determining a resource ID associated with the active beam RRS. In some cases, the resource ID is associated with an antenna port configuration used by the base station to transmit the active beam RRS and the active beam. In some cases, identifying the active beam RRS as corresponding to the active beam includes identifying one or more antenna ports associated with the active beam RRS based on an antenna port configuration of the active beam. In some cases, the UE receive configuration includes one or more of a number of physical antenna arrays of the UE, a number of receive chains of the UE, a number of supported receive beams of the UE, or combinations thereof. In some cases, the predetermined duration includes a predetermined number of symbols. In some cases, the RRS includes at least one of a BRSS or a CSI-RS.

Beam state measurement component 735 may perform a beam state measurement on at least the active beam RRS, identify a refined beam state information of the one or more receive beams, use a set of UE antenna arrays to perform the beam state measurement on at least the active beam RRS, and transmit, to a base station, a beam state measurement report including BSI for a predetermined number of previously transmitted BRSs, the beam state measurement report further including an indication of a UE receive configuration.

Beam refinement component 740 may refine the active beam based on the beam state measurement on the active beam RRS and refine the active beam based on the active beam refinement authorization. In some cases, refining the active beam includes: using one or more receive beams to receive the active beam RRS. In some cases, refining the active beam includes: receiving an active beam refinement authorization from the base station.

Antenna port component 745 may receive, from a base station, an indicator associating one or more antenna ports of a RRS with a prior reference signal transmitted from the base station and receive, from a base station, an indicator associating each of one or more antenna ports of a RRS with a corresponding prior reference signal transmitted from the base station.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
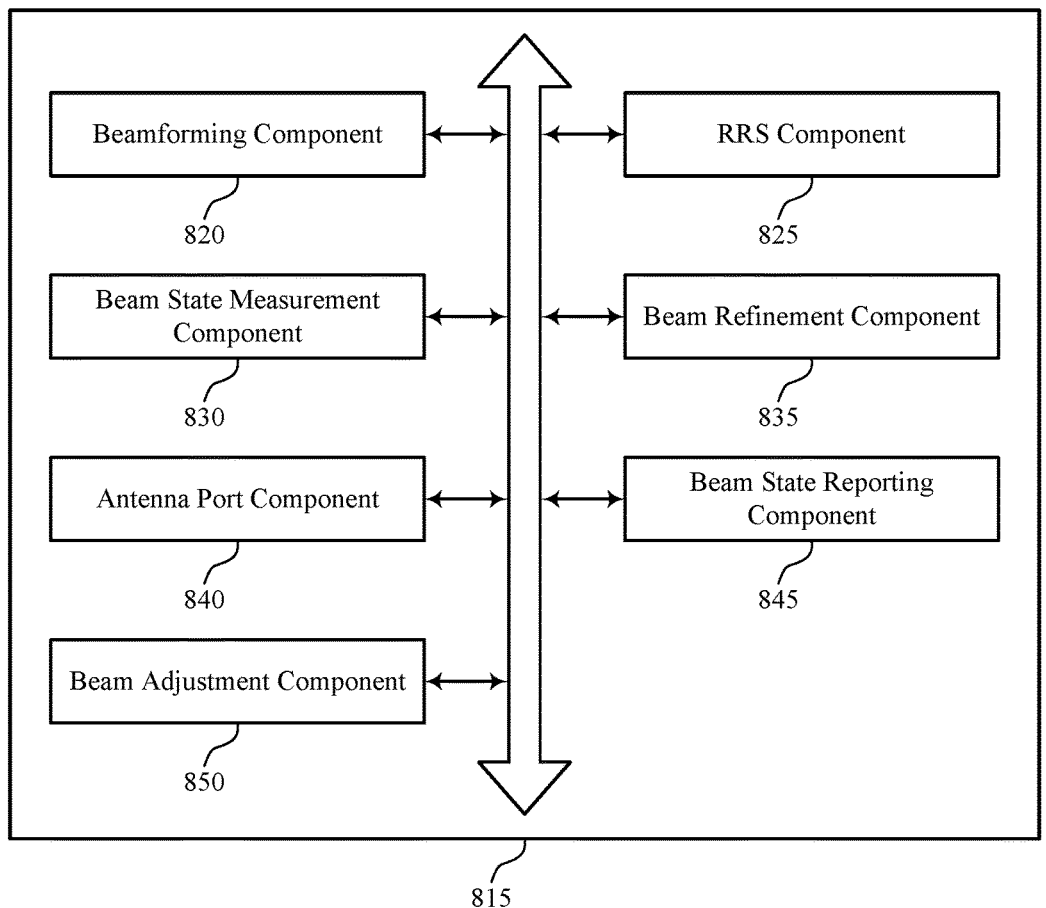

FIG. 8 shows a block diagram 800 of a UE beam refinement manager 815 that supports beam refinement for active and candidate beams in accordance with various aspects of the present disclosure. The UE beam refinement manager 815 may be an example of aspects of a UE beam refinement manager 615, a UE beam refinement manager 715, or a UE beam refinement manager 915 described with reference to FIGS. 6, 7, and 9. The UE beam refinement manager 815 may include beamforming component 820, RRS component 825, beam state measurement component 830, beam refinement component 835, antenna port component 840, beam state reporting component 845, and beam adjustment component 850. Each of these modules may communicate, directly or indirectly, with one another (e.g., via one or more buses).

Beamforming component 820 may communicate with a base station via one or more beamformed transmissions on an active beam. RRS component 825 may receive from the base station one or more RRSs.

Beam state measurement component 830 may perform a beam state measurement on at least the active beam RRS, identify a refined beam state information of the one or more receive beams, use a set of UE antenna arrays to perform the beam state measurement on at least the active beam RRS, and transmit, to a base station, a beam state measurement report including BSI for a predetermined number of previously transmitted BRSs, the beam state measurement report further including an indication of a UE receive configuration.

Beam refinement component 835 may refine the active beam based on the beam state measurement on the active beam RRS and refine the active beam based on the active beam refinement authorization. In some cases, refining the active beam includes: using one or more receive beams to receive the active beam RRS. In some cases, refining the active beam includes: receiving an active beam refinement authorization from the base station.

Antenna port component 840 may receive, from a base station, an indicator associating one or more antenna ports of a RRS with a prior reference signal transmitted from the base station and receive, from a base station, an indicator associating each of one or more antenna ports of a RRS with a corresponding prior reference signal transmitted from the base station.

Beam state reporting component 845 may transmit a beam state measurement report to the base station. In some cases, the beam state measurement report includes a reference signal received power associated with at least the active beam RRS. In some cases, the beam state measurement report associated with the active beam RRS does not include an index associated with a resource ID.

Beam adjustment component 850 may use the refined beam state information to adjust the active beam used by a UE, adjust the active beam at a predetermined time, and transmit an indicator to the base station indicative of the adjustment to the active beam.

Figure 9:
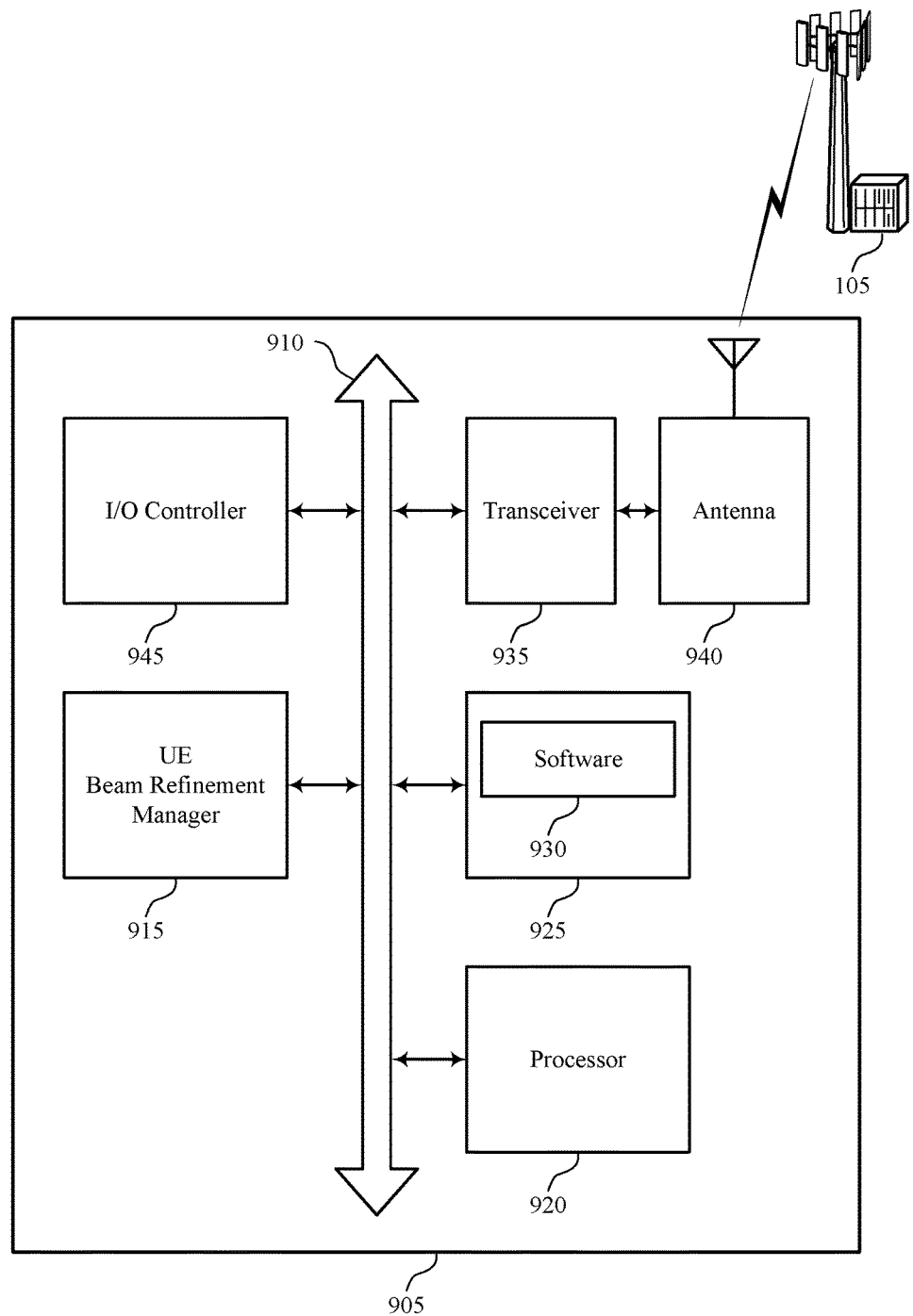
FIG. 9 illustrates a block diagram of a system including a UE that supports beam refinement for active and candidate beams in accordance with aspects of the present disclosure.

FIG. 9 shows a diagram of a system 900 including a device 905 that supports beam refinement for active and candidate beams in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE beam refinement manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting beam refinement for active and candidate beams).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support beam refinement for active and candidate beams. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
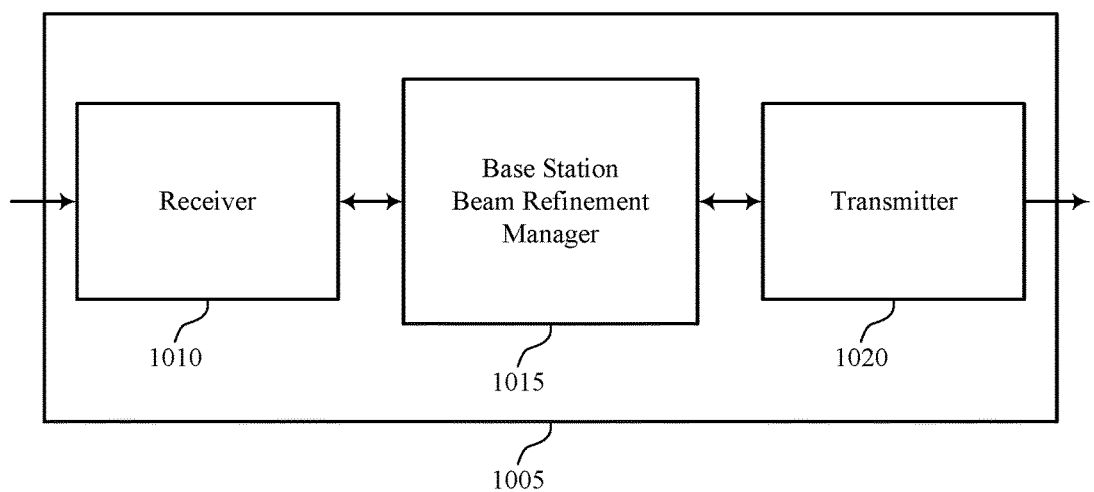
FIGS. 10 through 12 show block diagrams of a device that supports beam refinement for active and candidate beams in accordance with aspects of the present disclosure.

FIG. 10 shows a block diagram 1000 of a wireless device 1005 that supports beam refinement for active and candidate beams in accordance with various aspects of the present disclosure. Wireless device 1005 may be an example of aspects of a base station 105 as described with reference to FIG. 1. Wireless device 1005 may include receiver 1010, base station beam refinement manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to beam refinement for active and candidate beams, etc.). Information may be passed on to other components of the device. The receiver 1010 may be an example of aspects of the transceiver 1335 described with reference to FIG. 13.

Base station beam refinement manager 1015 may be an example of aspects of the base station beam refinement manager 1315 described with reference to FIG. 13. Base station beam refinement manager 1015 may communicate with a UE via one or more beamformed transmissions using an active beam, select one or more RRSs for transmission to the UE, the one or more RRSs including an active beam RRS corresponding to the active beam, transmit the one or more RRSs, including the active beam RRS, to the UE, and indicate to the UE that the active beam RRS corresponds to the active beam.

The base station beam refinement manager 1015 may also receive, from, a UE, a beam state measurement report including BSI for a predetermined number of previously transmitted BRSs, select one or more RRSs for transmission to the UE based on the beam state measurement report, and transmit the one or more RRSs in a predetermined order that is based on the beam state measurement report.

The base station beam refinement manager 1015 may also receive, from, a UE, a beam state measurement report including BSI for a predetermined number of previously transmitted BRSs, the beam state measurement report further including an indication of a UE receive configuration, select one or more RRSs for transmission to the UE based on the beam state measurement report, select an RRS transmission configuration based on the UE receive configuration, and transmit the one or more RRSs in accordance with the RRS transmission configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
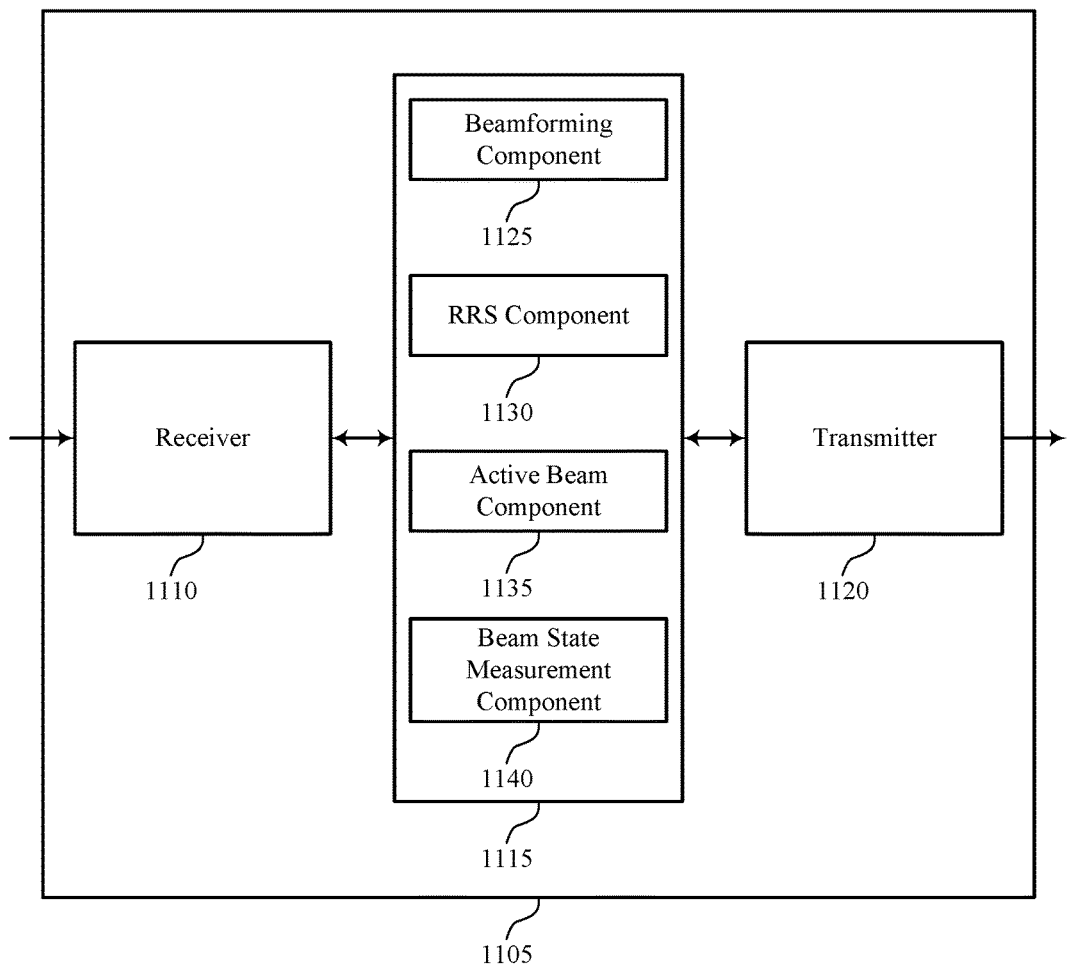

FIG. 11 shows a block diagram 1100 of a wireless device 1105 that supports beam refinement for active and candidate beams in accordance with various aspects of the present disclosure. Wireless device 1105 may be an example of aspects of a wireless device 1005 or a base station 105 as described with reference to FIGS. 1 and 10. Wireless device 1105 may include receiver 1110, base station beam refinement manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to beam refinement for active and candidate beams, etc.). Information may be passed on to other components of the device. The receiver 1110 may be an example of aspects of the transceiver 1335 described with reference to FIG. 13.

Base station beam refinement manager 1115 may be an example of aspects of the base station beam refinement manager 1315 described with reference to FIG. 13. Base station beam refinement manager 1115 may also include beamforming component 1125, RRS component 1130, active beam component 1135, and beam state measurement component 1140.

Beamforming component 1125 may communicate with a UE via one or more beamformed transmissions using an active beam. RRS component 1130 may select one or more RRSs for transmission to the UE, the one or more RRSs including an active beam RRS corresponding to the active beam, and transmit the one or more RRSs in accordance with the RRS transmission configuration includes transmitting at least a portion of the one or more RRSs during the same symbol, RRS component 1130 may also transmit, to the UE, an indicator associating the one or more RRSs with a prior reference signal transmitted from the base station, and transmit, to the UE, an indicator associating each of the one or more RRSs with a corresponding prior reference signal transmitted from the base station. RRS component 1130 may select one or more RRSs for transmission to the UE based on the beam state measurement report. RRS component 1130 may transmit the one or more RRSs in a predetermined order that is based on the beam state measurement report, and may also transmit the one or more RRSs in a sequential order, where the sequential order is based on the beam state measurement report, as well as further transmit the one or more RRSs, including the active beam RRS, to the UE. RRS component 1130 may select an RRS transmission configuration based on the UE receive configuration.

RRS component 1130 may also transmit the one or more RRSs in accordance with the RRS transmission configuration, transmit the one or more RRSs in accordance with the RRS transmission configuration by transmitting each of the one or more RRSs in at least one of a predetermined order or according to a TDM configuration, and transmit the one or more RRSs in accordance with the RRS transmission configuration includes transmitting each of the one or more RRSs for a predetermined duration. In some cases, the predetermined order corresponds to an order of the BSI for the BRSs conveyed in the beam state measurement report.

In some cases, the BSI conveys an indication of a received signal strength for each of the BRSs, and the predetermined order is based on the received signal strength for each of the BRSs. In some cases, the UE receive configuration includes one or more of a number of physical antenna arrays of the UE, a number of receive chains of the UE, a number of supported receive beams of the UE, or combinations thereof. In some cases, the predetermined duration includes a predetermined number of symbols. In some cases, each of the one or more RRSs are transmitted for a predetermined number of symbols in accordance with the sequential order.

Active beam component 1135 may indicate to the UE that the active beam RRS corresponds to the active beam. In some cases, indicating to the UE that the active beam RRS corresponds to the active beam includes: conveying an indication of a resource ID associated with the active beam RRS, where the resource ID is further associated with the active beam. In some cases, the indication is an antenna port configuration used by the base station to transmit the active beam RRS.

Beam state measurement component 1140 may receive a beam state measurement report from the UE, receive, from, a UE, a beam state measurement report including BSI for a predetermined number of previously transmitted BRSs, and receive, from, a UE, a beam state measurement report including BSI for a predetermined number of previously transmitted BRSs, the beam state measurement report further including an indication of a UE receive configuration. In some cases, the beam state measurement report includes a reference signal received power associated with at least the active beam RRS. In some cases, the beam state measurement report includes an index associated with a resource ID associated with the active beam RRS. In some cases, the beam state measurement report associated with the active beam RRS does not include a resource ID associated with the active beam RRS.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
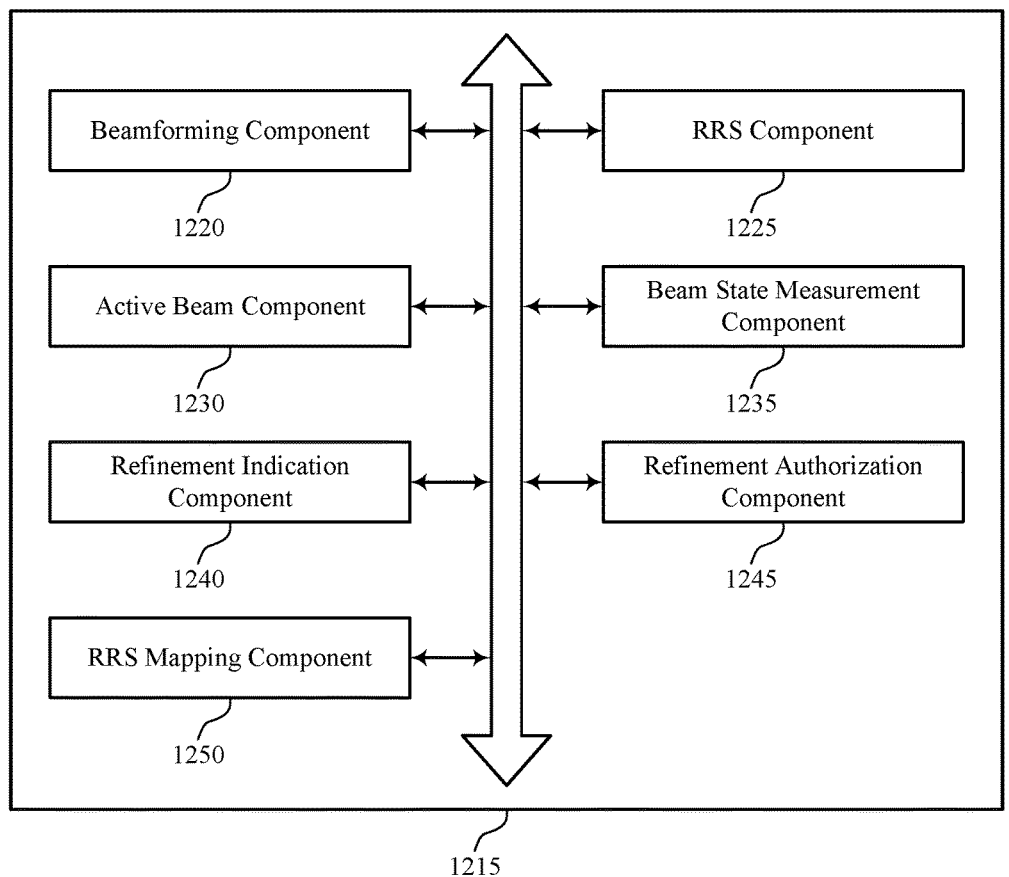

FIG. 12 shows a block diagram 1200 of a base station beam refinement manager 1215 that supports beam refinement for active and candidate beams in accordance with various aspects of the present disclosure. The base station beam refinement manager 1215 may be an example of aspects of a base station beam refinement manager 1315 described with reference to FIGS. 10, 11, and 13. The base station beam refinement manager 1215 may include beamforming component 1220, RRS component 1225, active beam component 1230, beam state measurement component 1235, refinement indication component 1240, refinement authorization component 1245, and RRS mapping component 1250. Each of these modules may communicate, directly or indirectly, with one another (e.g., via one or more buses).

Beamforming component 1220 may communicate with a UE via one or more beamformed transmissions using an active beam. RRS component 1225 may select one or more RRSs for transmission to the UE.

Active beam component 1230 may indicate to the UE that the active beam RRS corresponds to the active beam. In some cases, indicating to the UE that the active beam RRS corresponds to the active beam includes: conveying an indication of a resource ID associated with the active beam RRS, where the resource ID is further associated with the active beam. In some cases, the indication is an antenna port configuration used by the base station to transmit the active beam RRS.

Beam state measurement component 1235 may receive a beam state measurement report from the UE, receive, from, a UE, a beam state measurement report including BSI for a predetermined number of previously transmitted BRSs, and receive, from, a UE, a beam state measurement report including BSI for a predetermined number of previously transmitted BRSs, the beam state measurement report further including an indication of a UE receive configuration.

In some cases, the beam state measurement report includes a reference signal received power associated with at least the active beam RRS. In some cases, the beam state measurement report includes an index associated with a resource ID associated with the active beam RRS. In some cases, the beam state measurement report associated with the active beam RRS does not include a resource ID associated with the active beam RRS.

Refinement indication component 1240 may receive an indication from the UE that the UE has used a refined beam to adjust a UE beamform signal.

Refinement authorization component 1245 may transmit an active beam refinement authorization to the UE, where the UE refines the active beam based on the active beam refinement authorization. RRS mapping component 1250 may map the one or more RRSs to resource IDs that correspond to resource IDs associated with the BRSs.

Figure 13:
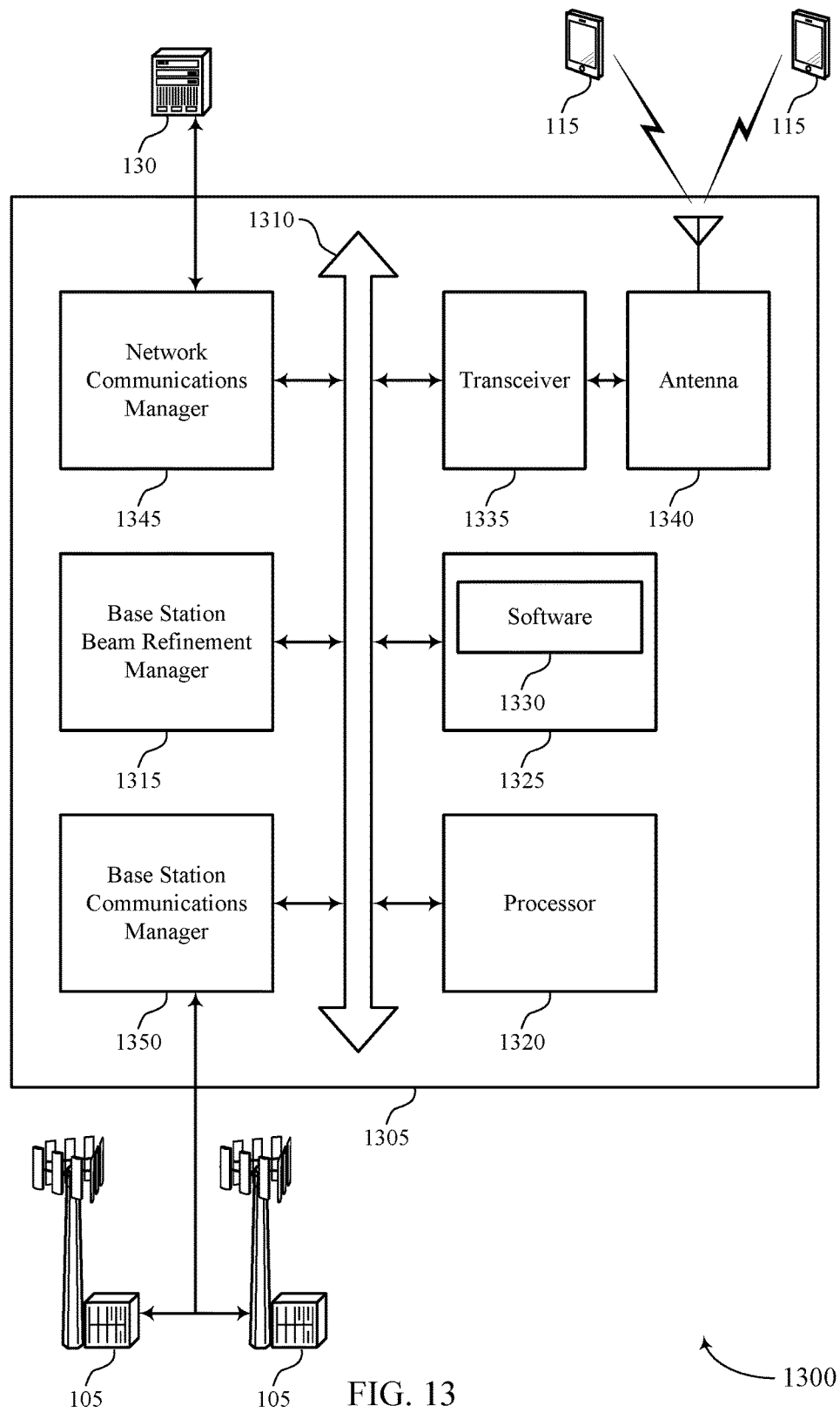
FIG. 13 illustrates a block diagram of a system including a base station that supports beam refinement for active and candidate beams in accordance with aspects of the present disclosure.

FIG. 13 shows a diagram of a system 1300 including a device 1305 that supports beam refinement for active and candidate beams in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station beam refinement manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting beam refinement for active and candidate beams).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support beam refinement for active and candidate beams. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
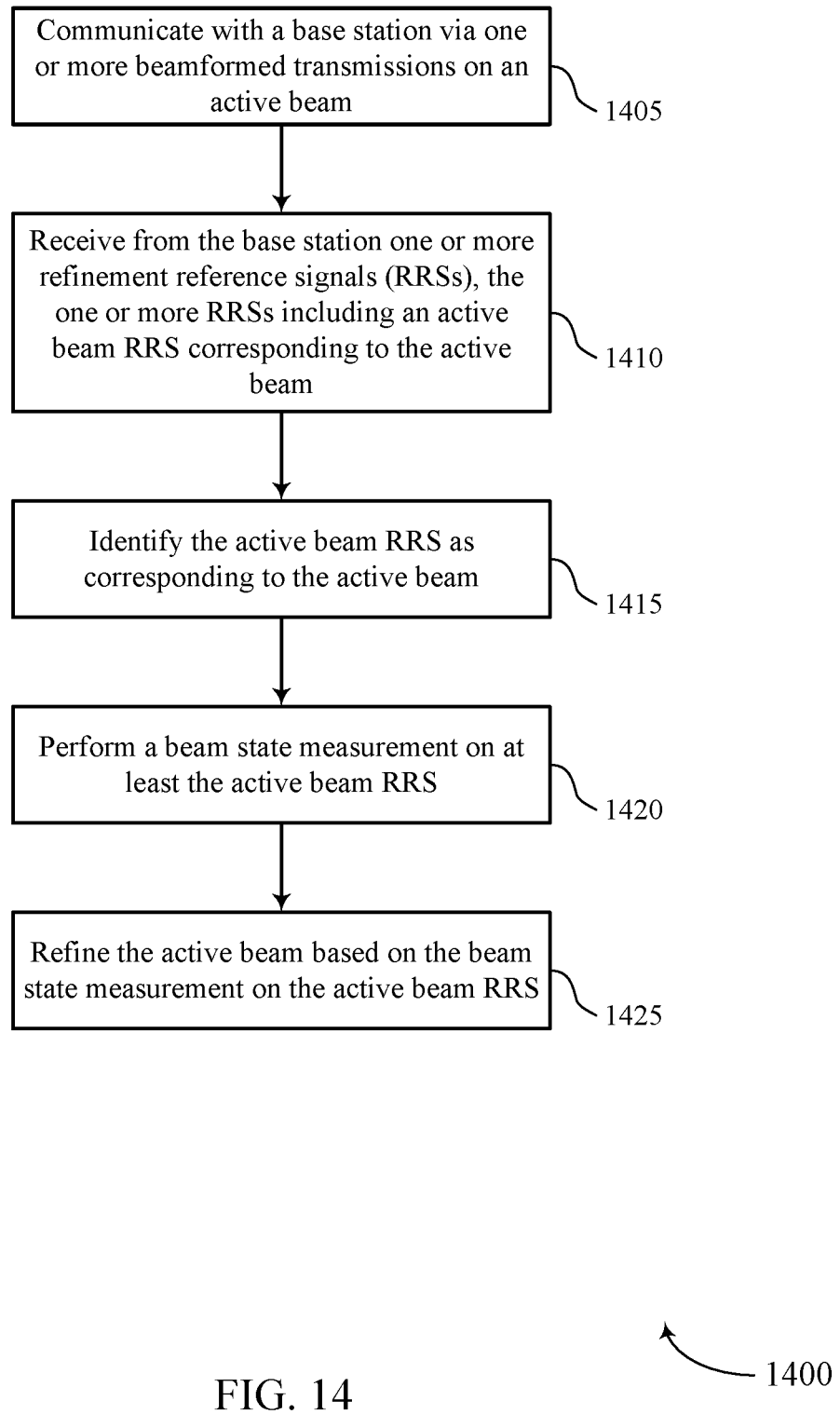
FIGS. 14 through 20 illustrate methods for beam refinement for active and candidate beams in accordance with aspects of the present disclosure.

FIG. 14 shows a flowchart illustrating a method 1400 for beam refinement for active and candidate beams in accordance with various aspects of the present disclosure. The operations of method 1400 may be implemented by a UE 115 or its components as described herein. For example, the operations of method 1400 may be performed by a UE beam refinement manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may communicate with a base station via one or more beamformed transmissions on an active beam. The operations of block 1405 may be performed according to the methods described with reference to FIGS. 1 through 5. In certain examples, aspects of the operations of block 1405 may be performed by a beamforming component as described with reference to FIGS. 6 through 9.

At block 1410 the UE 115 may receive from the base station one or more RRSs, the one or more RRSs including an active beam RRS corresponding to the active beam. The operations of block 1410 may be performed according to the methods described with reference to FIGS. 1 through 5. In certain examples, aspects of the operations of block 1410 may be performed by a RRS component as described with reference to FIGS. 6 through 9.

At block 1415 the UE 115 may identify the active beam RRS as corresponding to the active beam. The operations of block 1415 may be performed according to the methods described with reference to FIGS. 1 through 5. In certain examples, aspects of the operations of block 1415 may be performed by a RRS component as described with reference to FIGS. 6 through 9.

At block 1420 the UE 115 may perform a beam state measurement on at least the active beam RRS. The operations of block 1420 may be performed according to the methods described with reference to FIGS. 1 through 5. In certain examples, aspects of the operations of block 1420 may be performed by a beam state measurement component as described with reference to FIGS. 6 through 9.

At block 1425 the UE 115 may refine the active beam based at least in part on the beam state measurement on the active beam RRS. The operations of block 1425 may be performed according to the methods described with reference to FIGS. 1 through 5. In certain examples, aspects of the operations of block 1425 may be performed by a beam refinement component as described with reference to FIGS. 6 through 9.

Figure 15:
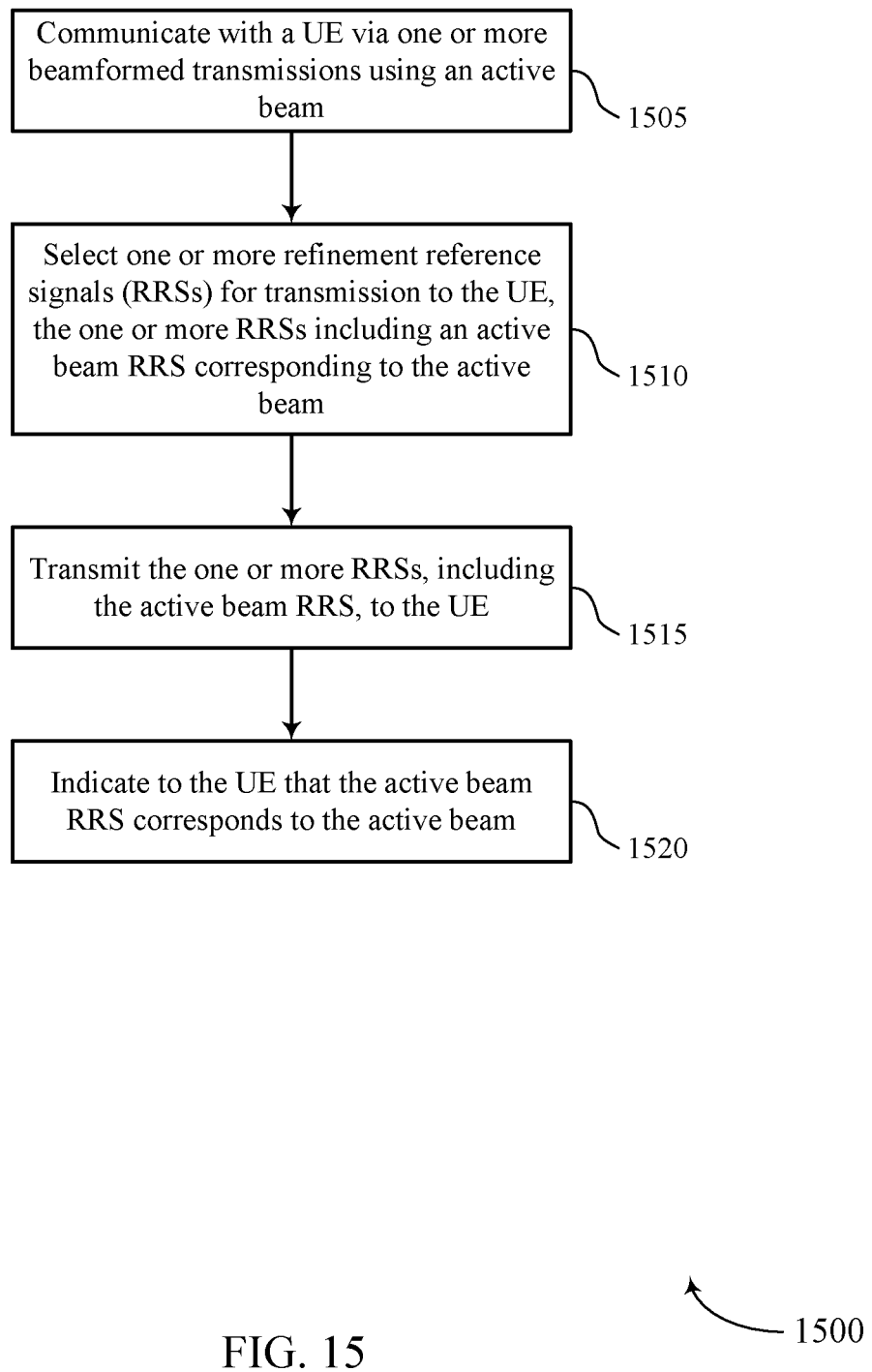

FIG. 15 shows a flowchart illustrating a method 1500 for beam refinement for active and candidate beams in accordance with various aspects of the present disclosure. The operations of method 1500 may be implemented by a base station 105 or its components as described herein. For example, the operations of method 1500 may be performed by a base station beam refinement manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may communicate with a UE via one or more beamformed transmissions using an active beam. The operations of block 1505 may be performed according to the methods described with reference to FIGS. 1 through 5. In certain examples, aspects of the operations of block 1505 may be performed by a beamforming component as described with reference to FIGS. 10 through 13.

At block 1510 the base station 105 may select one or more RRSs for transmission to the UE, the one or more RRSs including an active beam RRS corresponding to the active beam. The operations of block 1510 may be performed according to the methods described with reference to FIGS. 1 through 5. In certain examples, aspects of the operations of block 1510 may be performed by a RRS component as described with reference to FIGS. 10 through 13.

At block 1515 the base station 105 may transmit the one or more RRSs, including the active beam RRS, to the UE. The operations of block 1515 may be performed according to the methods described with reference to FIGS. 1 through 5. In certain examples, aspects of the operations of block 1515 may be performed by a RRS component as described with reference to FIGS. 10 through 13.

At block 1520 the base station 105 may indicate to the UE that the active beam RRS corresponds to the active beam. The operations of block 1520 may be performed according to the methods described with reference to FIGS. 1 through 5. In certain examples, aspects of the operations of block 1520 may be performed by a active beam component as described with reference to FIGS. 10 through 13.

Figure 16:
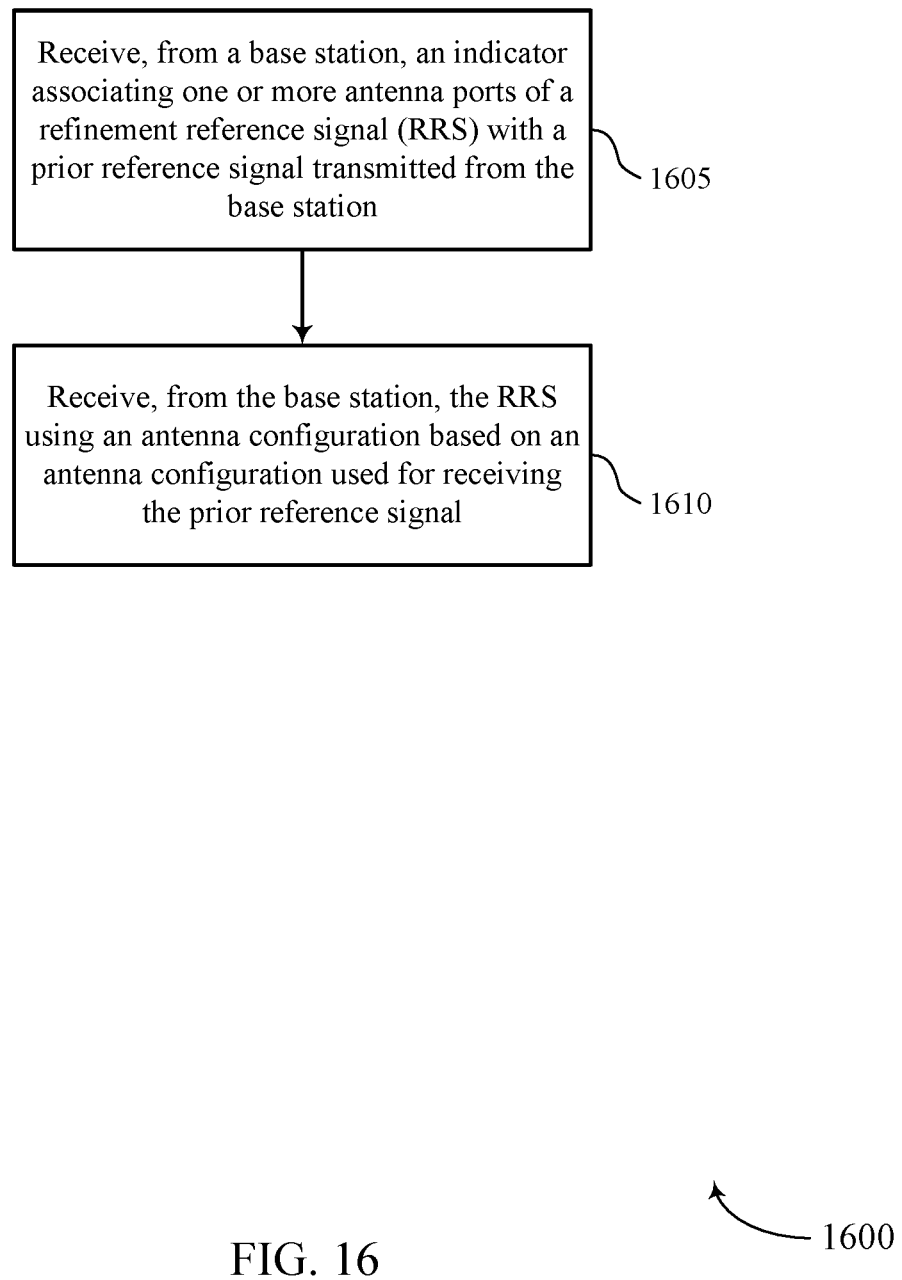

FIG. 16 shows a flowchart illustrating a method 1600 for beam refinement for active and candidate beams in accordance with various aspects of the present disclosure. The operations of method 1600 may be implemented by a UE 115 or its components as described herein. For example, the operations of method 1600 may be performed by a UE beam refinement manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, from a base station, an indicator associating one or more antenna ports of a RRS with a prior reference signal transmitted from the base station. The operations of block 1605 may be performed according to the methods described with reference to FIGS. 1 through 5. In certain examples, aspects of the operations of block 1605 may be performed by an antenna port component as described with reference to FIGS. 6 through 9.

At block 1610 the UE 115 may receive, from the base station, the RRS using an antenna configuration based at least in part on an antenna configuration used for receiving the prior reference signal. The operations of block 1610 may be performed according to the methods described with reference to FIGS. 1 through 5. In certain examples, aspects of the operations of block 1610 may be performed by a RRS component as described with reference to FIGS. 6 through 9.

Figure 17:
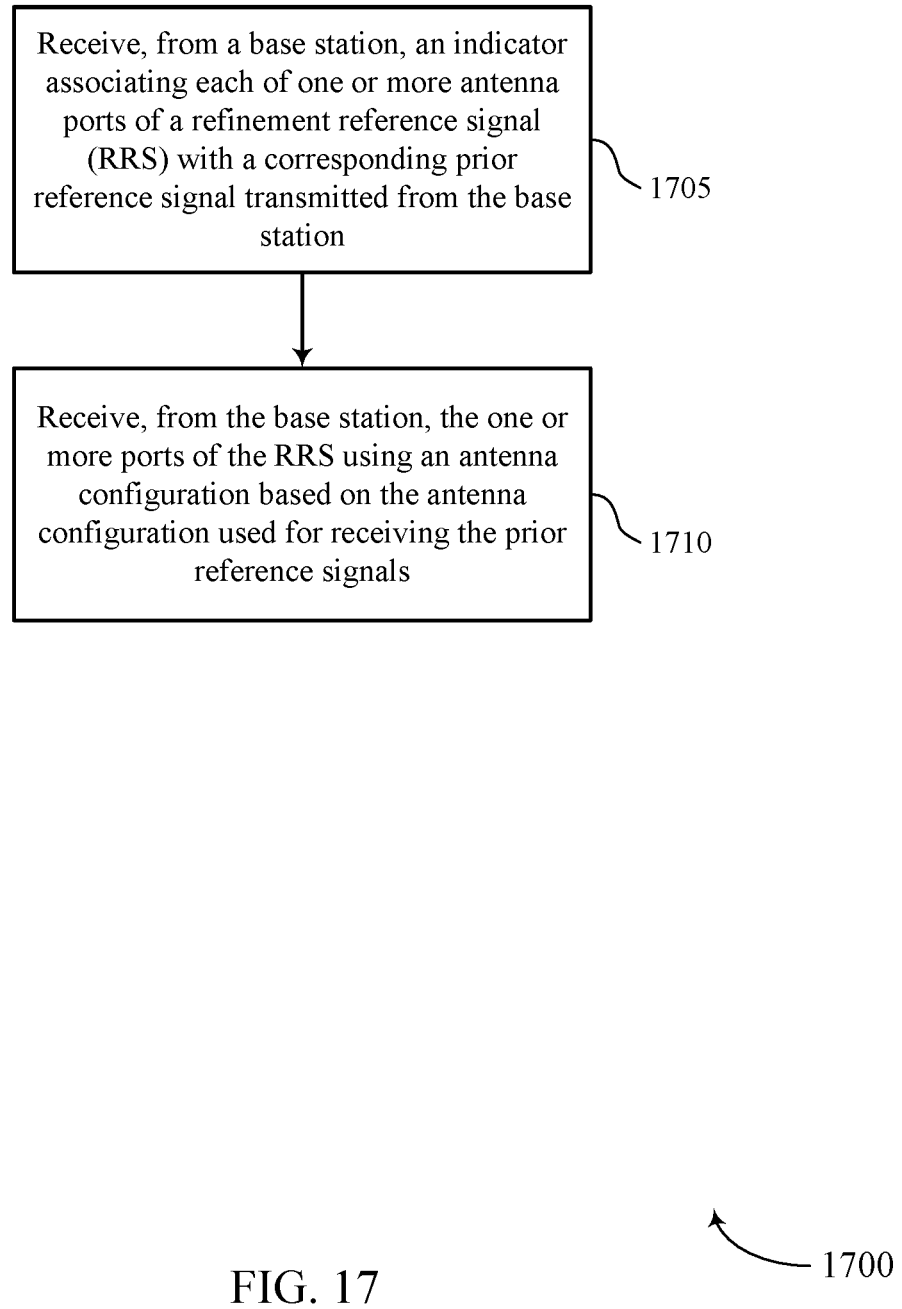

FIG. 17 shows a flowchart illustrating a method 1700 for beam refinement for active and candidate beams in accordance with various aspects of the present disclosure. The operations of method 1700 may be implemented by a UE 115 or its components as described herein. For example, the operations of method 1700 may be performed by a UE beam refinement manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, from a base station, an indicator associating each of one or more antenna ports of a RRS with a corresponding prior reference signal transmitted from the base station. The operations of block 1705 may be performed according to the methods described with reference to FIGS. 1 through 5. In certain examples, aspects of the operations of block 1705 may be performed by an antenna port component as described with reference to FIGS. 6 through 9.

At block 1710 the UE 115 may receive, from the base station, the one or more ports of the RRS using an antenna configuration based at least in part on the antenna configuration used for receiving the prior reference signals. The operations of block 1710 may be performed according to the methods described with reference to FIGS. 1 through 5. In certain examples, aspects of the operations of block 1710 may be performed by a RRS component as described with reference to FIGS. 6 through 9.

Figure 18:
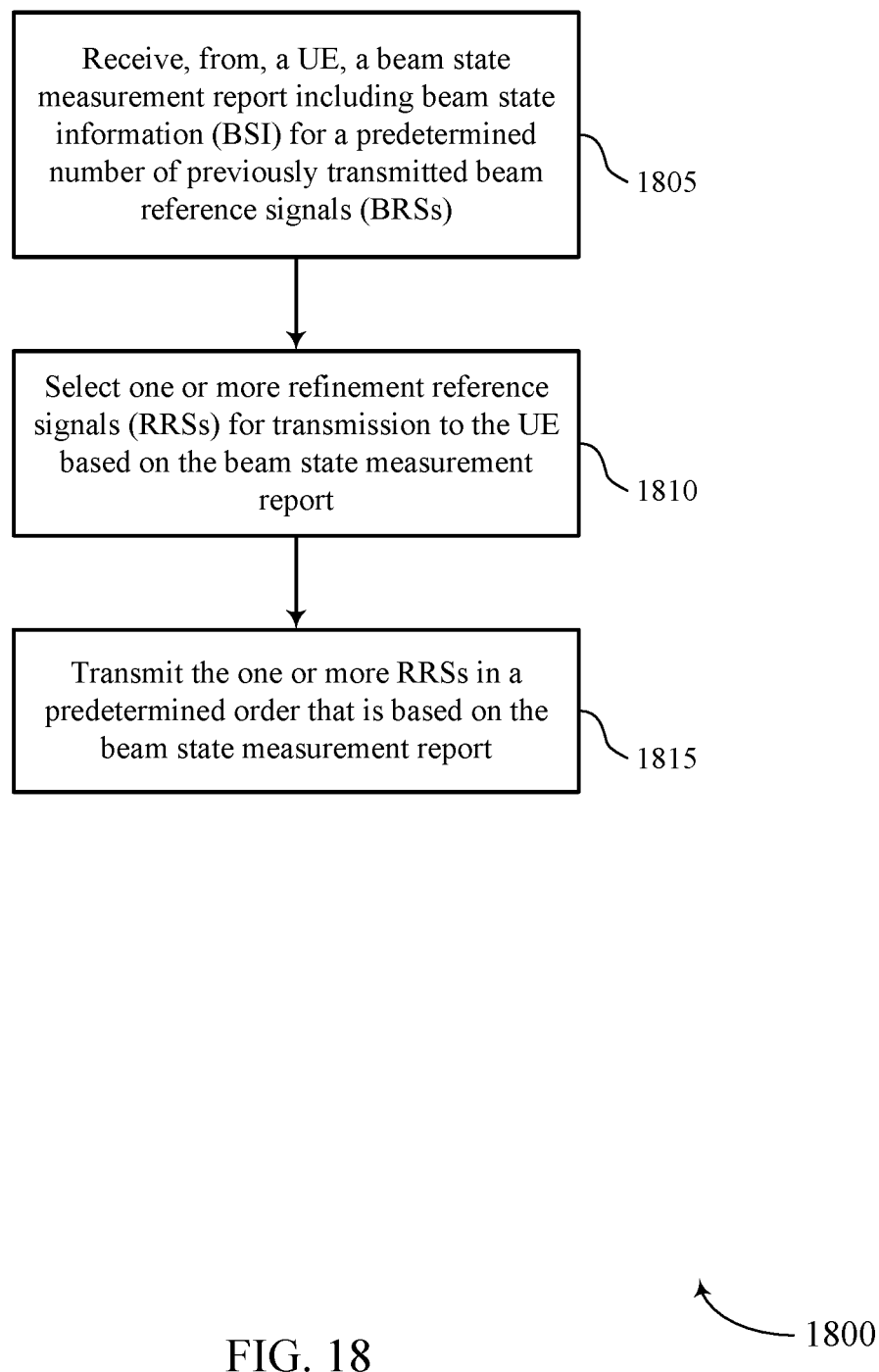

FIG. 18 shows a flowchart illustrating a method 1800 for beam refinement for active and candidate beams in accordance with various aspects of the present disclosure. The operations of method 1800 may be implemented by a base station 105 or its components as described herein. For example, the operations of method 1800 may be performed by a base station beam refinement manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may receive, from, a UE, a beam state measurement report comprising BSI for a predetermined number of previously transmitted BRSs. The operations of block 1805 may be performed according to the methods described with reference to FIGS. 1 through 5. In certain examples, aspects of the operations of block 1805 may be performed by a beam state measurement component as described with reference to FIGS. 10 through 13.

At block 1810 the base station 105 may select one or more RRSs for transmission to the UE based at least in part on the beam state measurement report. The operations of block 1810 may be performed according to the methods described with reference to FIGS. 1 through 5. In certain examples, aspects of the operations of block 1810 may be performed by a RRS component as described with reference to FIGS. 10 through 13.

At block 1815 the base station 105 may transmit the one or more RRSs in a predetermined order that is based at least in part on the beam state measurement report. The operations of block 1815 may be performed according to the methods described with reference to FIGS. 1 through 5. In certain examples, aspects of the operations of block 1815 may be performed by a RRS component as described with reference to FIGS. 10 through 13.

Figure 19:
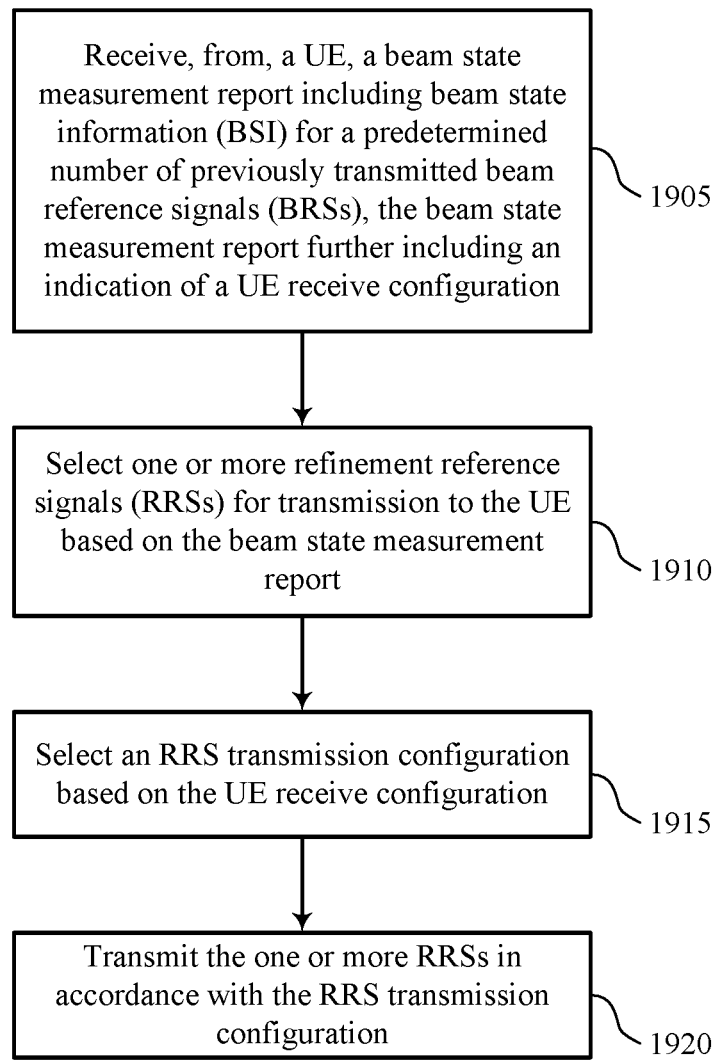

FIG. 19 shows a flowchart illustrating a method 1900 for beam refinement for active and candidate beams in accordance with various aspects of the present disclosure. The operations of method 1900 may be implemented by a base station 105 or its components as described herein. For example, the operations of method 1900 may be performed by a base station beam refinement manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may receive, from, a UE, a beam state measurement report comprising BSI for a predetermined number of previously transmitted BRSs, the beam state measurement report further comprising an indication of a UE receive configuration. The operations of block 1905 may be performed according to the methods described with reference to FIGS. 1 through 5. In certain examples, aspects of the operations of block 1905 may be performed by a beam state measurement component as described with reference to FIGS. 10 through 13.

At block 1910 the base station 105 may select one or more RRSs for transmission to the UE based at least in part on the beam state measurement report. The operations of block 1910 may be performed according to the methods described with reference to FIGS. 1 through 5. In certain examples, aspects of the operations of block 1910 may be performed by a RRS component as described with reference to FIGS. 10 through 13.

At block 1915 the base station 105 may select an RRS transmission configuration based at least in part on the UE receive configuration. The operations of block 1915 may be performed according to the methods described with reference to FIGS. 1 through 5. In certain examples, aspects of the operations of block 1915 may be performed by a RRS component as described with reference to FIGS. 10 through 13.

At block 1920 the base station 105 may transmit the one or more RRSs in accordance with the RRS transmission configuration. The operations of block 1920 may be performed according to the methods described with reference to FIGS. 1 through 5. In certain examples, aspects of the operations of block 1920 may be performed by a RRS component as described with reference to FIGS. 10 through 13.

Figure 20:
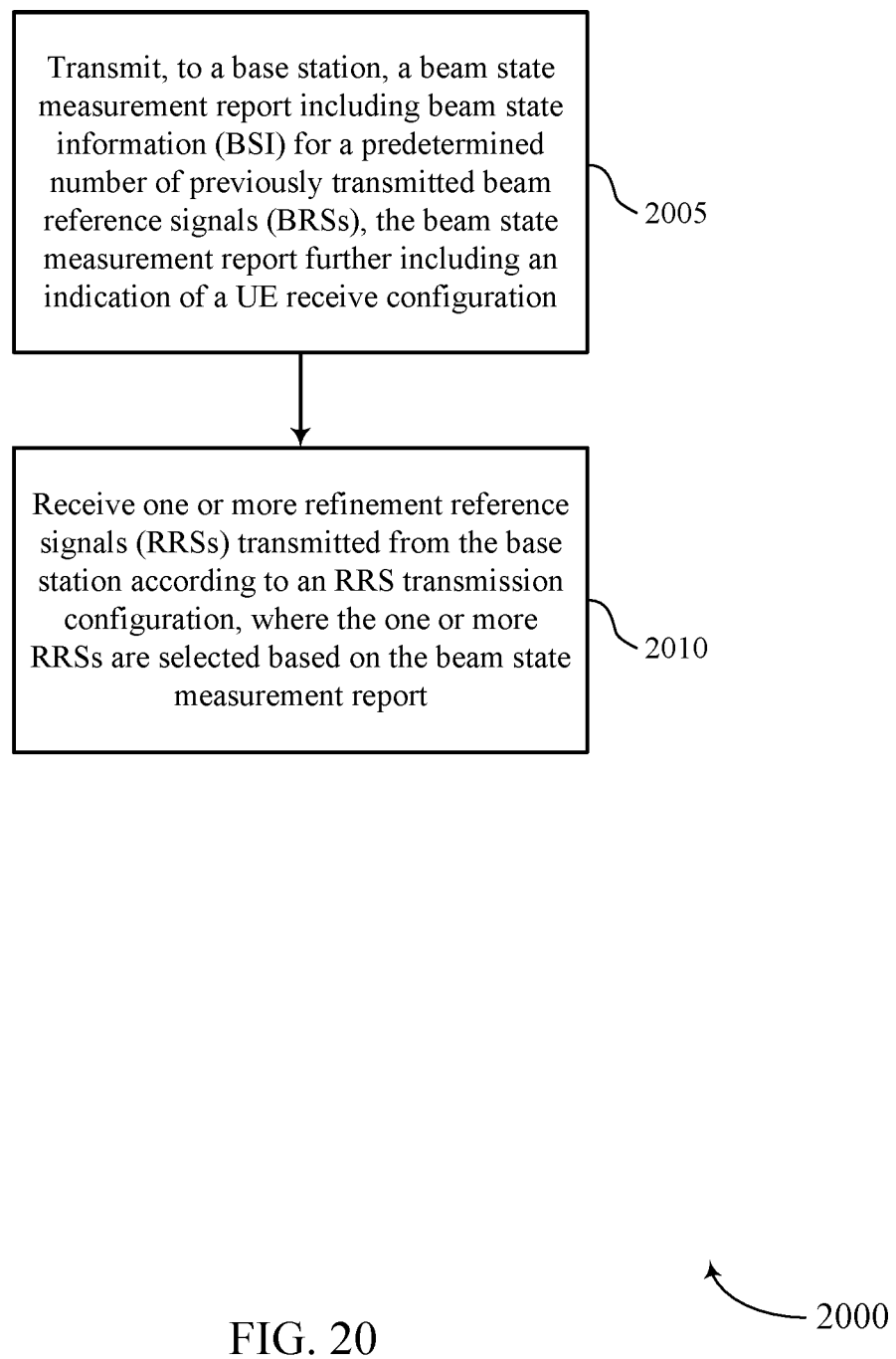

FIG. 20 shows a flowchart illustrating a method 2000 for beam refinement for active and candidate beams in accordance with various aspects of the present disclosure. The operations of method 2000 may be implemented by a UE 115 or its components as described herein. For example, the operations of method 2000 may be performed by a UE beam refinement manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may transmit, to a base station, a beam state measurement report comprising BSI for a predetermined number of previously transmitted BRSs, the beam state measurement report further comprising an indication of a UE receive configuration. The operations of block 2005 may be performed according to the methods described with reference to FIGS. 1 through 5. In certain examples, aspects of the operations of block 2005 may be performed by a beam state measurement component as described with reference to FIGS. 6 through 9.

At block 2010 the UE 115 may receive one or more RRSs transmitted from the base station according to an RRS transmission configuration, wherein the one or more RRSs are selected based at least in part on the beam state measurement report. The operations of block 2010 may be performed according to the methods described with reference to FIGS. 1 through 5. In certain examples, aspects of the operations of block 2010 may be performed by a RRS component as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   communicating with a base station via one or more beamformed transmissions on an active beam, the active beam being selected using beam reference signals (BRSs) in a BRS procedure;
   receiving from the base station a plurality of refinement reference signals (RRSs) as part of a beam refinement procedure, the plurality of RRSs including an active beam RRS corresponding to the active beam;
   determining that the active beam RRS of the plurality of RRSs corresponds to the active beam;
   performing a beam state measurement on at least the active beam RRS; and
   refining the active beam based at least in part on the beam state measurement on the active beam RRS.

2. The method of claim 1, wherein determining that the active beam RRS corresponds to the active beam comprises:
   determining a resource identifier (ID) associated with the active beam RRS.

3. The method of claim 2, further comprising:
   identifying the resource ID based on an indication conveyed in a radio resource control (RRC) configuration procedure performed with the base station.

4. The method of claim 2, wherein the resource ID is associated with an antenna port configuration used by the base station to transmit the active beam RRS and the active beam.

5. The method of claim 1, wherein determining that the active beam RRS corresponds to the active beam comprises:
   identifying one or more antenna ports associated with the active beam RRS based on an antenna port configuration of the active beam.

6. The method of claim 1, further comprising:
   transmitting a beam state measurement report to the base station.

7. The method of claim 6, wherein the beam state measurement report comprises a reference signal received power associated with at least the active beam RRS.

8. The method of claim 6, wherein the beam state measurement report associated with the active beam RRS does not include an index associated with a resource identifier (ID).

9. The method of claim 1, wherein refining the active beam comprises:
   using one or more receive beams to receive the active beam RRS;
   identifying a refined beam state information of the one or more receive beams; and
   using the refined beam state information to adjust the active beam used by a user equipment (UE).

10. The method of claim 9, further comprising:
    adjusting the active beam at a predetermined time.

11. The method of claim 9, further comprising:
    transmitting an indicator to the base station indicative of the adjustment to the active beam.

12. The method of claim 1, wherein refining the active beam comprises:
    receiving an active beam refinement authorization from the base station; and
    refining the active beam based at least in part on the active beam refinement authorization.

13. The method of claim 1, further comprising:
    using a plurality of user equipment (UE) antenna arrays to perform the beam state measurement on at least the active beam RRS.

14. The method of claim 1, further comprising:
    receiving, from the base station, an indicator associating the plurality of RRSs with a prior reference signal transmitted from the base station.

15. The method of claim 1, further comprising:
    receiving, from the base station, an indicator associating each of the plurality of RRSs with a corresponding prior reference signal transmitted from the base station.

16. The method of claim 1, wherein the RRSs comprise at least one of a beam refined reference signal (BRRS) or a channel state information reference signal (CSI-RS).

17. A method for wireless communication, comprising:
    communicating with a user equipment (UE) via one or more beamformed transmissions using an active beam, the active beam being selected using beam reference signals (BRSs) in a BRS procedure;
    selecting a plurality of refinement reference signals (RRSs) for transmission to the UE, the plurality of RRSs including an active beam RRS corresponding to the active beam;

transmitting the plurality of RRSs, including the active beam RRS, to the UE as part of a beam refinement procedure; and indicating to the UE that the active beam RRS of the plurality of RRSs corresponds to the active beam.

18. The method of claim 17, wherein indicating to the UE that the active beam RRS corresponds to the active beam comprises:

conveying an indication of a resource identifier (ID) associated with the active beam RRS, wherein the resource ID is further associated with the active beam.

19. The method of claim 18, wherein the indication is an antenna port configuration used to transmit the active beam RRS.

20. The method of claim 17, further comprising:
receiving a beam state measurement report from the UE.

21. The method of claim 20, wherein the beam state measurement report comprises a reference signal received power associated with at least the active beam RRS.

22. The method of claim 20, wherein the beam state measurement report comprises an index associated with a resource identifier (ID) associated with the active beam RRS.

23. The method of claim 20, wherein the beam state measurement report associated with the active beam RRS does not include a resource identifier (ID) associated with the active beam RRS.

24. The method of claim 17, further comprising:
receiving an indication from the UE that the UE has used a refined beam to adjust a UE beamform signal.

25. The method of claim 17, further comprising:
transmitting, to the UE, an indicator associating the plurality of RRSs with a prior reference signal.

26. The method of claim 17, further comprising:
transmitting, to the UE, an indicator associating each of the plurality of RRSs with a corresponding prior reference signal.

27. The method of claim 17, further comprising:
transmitting an active beam refinement authorization to the UE, wherein the UE refines the active beam based at least in part on the active beam refinement authorization.

28. A method for wireless communication, comprising:
receiving, from a base station, an indicator indicating that a first antenna port of a refinement reference signal (RRS) is quasi co-located with a first prior reference signal transmitted from the base station; and
receiving, from the base station, the RRS of the first antenna port using a first antenna configuration used for receiving the first prior reference signal based at least in part on the RRS being quasi co-located with the first prior reference signal.

29. The method of claim 28, wherein the indicator associates a second antenna port of the RRS with the first prior reference signal, and wherein receiving the RRS comprises:
receiving the RRS of the first antenna port and the second antenna port using the first antenna configuration used for receiving the first prior reference signal.

30. The method of claim 28, wherein the indicator associates a second antenna port of the RRS with a second prior reference signal, and wherein receiving the RRS comprises:
receiving the RRS of the first antenna port using the first antenna configuration used for receiving the first prior reference signal and receiving the RRS of the second antenna port using a second antenna configuration used for receiving the second prior reference signal.

31. An apparatus for wireless communication, in a system comprising:
a processor of a user equipment (UE);
memory in electronic communication with the processor; and
instructions stored in the memory and operable, when executed by the processor, to cause the apparatus to:
communicate with a base station via one or more beamformed transmissions on an active beam, the active beam being selected using beam reference signals (BRSs) in a BRS procedure;
receive from the base station a plurality of refinement reference signals (RRSs) as part of a beam refinement procedure, the plurality of RRSs including an active beam RRS corresponding to the active beam;
determine that the active beam RRS of the plurality of RRSs corresponds to the active beam;
perform a beam state measurement on at least the active beam RRS; and
refine the active beam based at least in part on the beam state measurement on the active beam RRS.

32. The apparatus of claim 31, wherein the instructions executable by the processor to determine that the active beam RRS corresponds to the active beam comprises:
determining a resource identifier (ID) associated with the active beam RRS.

33. The apparatus of claim 32, wherein the instructions are further executable by the processor to:
identify the resource ID based on an indication conveyed in a radio resource control (RRC) configuration procedure performed with the base station.

34. The apparatus of claim 32, wherein the resource ID is associated with an antenna port configuration used by the base station to transmit the active beam RRS and the active beam.

35. The apparatus of claim 31, wherein the instructions executable by the processor to determine that the active beam RRS corresponds to the active beam comprises:
identifying one or more antenna ports associated with the active beam RRS based on an antenna port configuration of the active beam.

36. The apparatus of claim 31, wherein the instructions are further executable by the processor to:
transmit a beam state measurement report to the base station.

37. The apparatus of claim 36, wherein the beam state measurement report comprises a reference signal received power associated with at least the active beam RRS.

38. The apparatus of claim 36, wherein the beam state measurement report associated with the active beam RRS does not include an index associated with a resource identifier (ID).

39. The apparatus of claim 31, wherein the instructions are further executable by the processor to:
use one or more receive beams to receive the active beam RRS;
identify a refined beam state information of the one or more receive beams; and
use the refined beam state information to adjust the active beam used by a user equipment (UE).

40. The apparatus of claim 39, wherein the instructions are further executable by the processor to:
adjust the active beam at a predetermined time.

41. The apparatus of claim 39, wherein the instructions are further executable by the processor to:
transmit an indicator to the base station indicative of the adjustment to the active beam.

42. The apparatus of claim 31, wherein the instructions are further executable by the processor to:
 receive an active beam refinement authorization from the base station; and
 refine the active beam based at least in part on the active beam refinement authorization.

43. The apparatus of claim 31, wherein the instructions are further executable by the processor to:
 use a plurality of user equipment (UE) antenna arrays to perform the beam state measurement on at least the active beam RRS.

44. The apparatus of claim 31, wherein the instructions are further executable by the processor to:
 receive, from the base station, an indicator associating the plurality of RRSs with a prior reference signal transmitted from the base station.

45. The apparatus of claim 31, wherein the instructions are further executable by the processor to:
 receive, from the base station, an indicator associating each of the plurality of RRSs with a corresponding prior reference signal transmitted from the base station.

46. The apparatus of claim 31, wherein the RRS comprises at least one of a beam refined reference signal (BRRS) or a channel state information reference signal (CSI-RS).

47. An apparatus for wireless communication, in a system comprising:
 a processor;
 memory in electronic communication with the processor; and
 instructions stored in the memory and operable, when executed by the processor, to cause the apparatus to:
  communicate with a user equipment (UE) via one or more beamformed transmissions using an active beam, the active beam being selected using beam reference signals (BRSs) in a BRS procedure;
  select a plurality of refinement reference signals (RRSs) for transmission to the UE, the plurality of RRSs including an active beam RRS corresponding to the active beam;
  transmit the plurality of RRSs, including the active beam RRS, to the UE as part of a beam refinement procedure; and
  indicate to the UE that the active beam RRS of the plurality of RRSs corresponds to the active beam.

48. The apparatus of claim 47, wherein the instructions executable by the processor to indicate to the UE that the active beam RRS corresponds to the active beam comprises:
 conveying an indication of a resource identifier (ID) associated with the active beam RRS, wherein the resource ID is further associated with the active beam.

49. The apparatus of claim 48, wherein the indication is an antenna port configuration used to transmit the active beam RRS.

50. The apparatus of claim 47, wherein the instructions are further executable by the processor to:
 receive a beam state measurement report from the UE.

51. The apparatus of claim 50, wherein the beam state measurement report comprises a reference signal received power associated with at least the active beam RRS.

52. The apparatus of claim 50, wherein the beam state measurement report comprises an index associated with a resource identifier (ID) associated with the active beam RRS.

53. The apparatus of claim 50, wherein the beam state measurement report associated with the active beam RRS does not include a resource identifier (ID) associated with the active beam RRS.

54. The apparatus of claim 47, wherein the instructions are further executable by the processor to:
 receive an indication from the UE that the UE has used a refined beam to adjust a UE beamform signal.

55. The apparatus of claim 47, wherein the instructions are further executable by the processor to:
 transmit, to the UE, an indicator associating the plurality of RRSs with a prior reference signal.

56. The apparatus of claim 47, wherein the instructions are further executable by the processor to:
 transmit, to the UE, an indicator associating each of the plurality of RRSs with a corresponding prior reference signal.

57. The apparatus of claim 47, wherein the instructions are further executable by the processor to:
 transmit an active beam refinement authorization to the UE, wherein the UE refines the active beam based at least in part on the active beam refinement authorization.

58. An apparatus for wireless communication, in a system comprising:
 a processor;
 memory in electronic communication with the processor; and
 instructions stored in the memory and operable, when executed by the processor, to cause the apparatus to:
  receive, from a base station, an indicator indicating that a first antenna port of a refinement reference signal (RRS) is quasi co-located with a first prior reference signal transmitted from the base station; and
  receive, from the base station, the RRS of the first antenna port using a first antenna configuration used for receiving the first prior reference signal based at least in part on the RRS being quasi co-located with the first prior reference signal.

59. The apparatus of claim 58, wherein the indicator associates a second antenna port of the RRS with the first prior reference signal, and wherein the instructions are further executable by the processor to:
 receive the RRS of the first antenna port and the second antenna port using the first antenna configuration used for receiving the first prior reference signal.

60. The apparatus of claim 58, wherein the indicator associates a second antenna port of the RRS with a second prior reference signal, and wherein the instructions are further executable by the processor to:
 receive the RRS of the first antenna port using the first antenna configuration used for receiving the first prior reference signal and receive the RRS of the second antenna port using a second antenna configuration used for receiving the second prior reference signal.

* * * * *